United States Patent
Xu et al.

(10) Patent No.: US 8,705,441 B2
(45) Date of Patent: Apr. 22, 2014

(54) JOINT USE OF MULTI-CARRIER AND SINGLE-CARRIER MULTIPLEXING SCHEMES FOR WIRELESS COMMUNICATION

(75) Inventors: Hao Xu, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 12/443,967

(22) PCT Filed: Nov. 1, 2007

(86) PCT No.: PCT/US2007/083382
§ 371 (c)(1),
(2), (4) Date: Jun. 30, 2009

(87) PCT Pub. No.: WO2008/057969
PCT Pub. Date: May 15, 2008

(65) Prior Publication Data
US 2010/0091919 A1 Apr. 15, 2010

Related U.S. Application Data

(60) Provisional application No. 60/863,885, filed on Nov. 1, 2006.

(51) Int. Cl.
*H04J 11/00* (2006.01)
*H04W 4/00* (2009.01)

(52) U.S. Cl.
USPC ............ 370/328; 370/208; 370/210; 370/329

(58) Field of Classification Search
None
See application file for complete search history.

(56) References Cited

U.S. PATENT DOCUMENTS 6,661,781 B1 * 12/2003 Chitre et al. .................. 370/330
7,876,806 B2 * 1/2011 Pan et al. ...................... 375/130
(Continued)

FOREIGN PATENT DOCUMENTS

| CN | 101479980 | 7/2009 |
|---|---|---|
| EP | 0986196 | 3/2000 |

(Continued)

OTHER PUBLICATIONS

Jianhua Zhang; Chen Huang; Guangyi Liu; Ping Zhang; , "Comparison of the Link Level Performance between OFDMA and SC-FDMA," Communications and Networking in China, 2006. ChinaCom '06. First International Conference on , vol., No., pp. 1-6, Oct. 25-27, 2006.*

(Continued)

*Primary Examiner* — Faruk Hamza
*Assistant Examiner* — Diane Lo
(74) *Attorney, Agent, or Firm* — Larry J. Moskowitz

(57) ABSTRACT

A communication system that facilitates transmissions in accordance with a single-carrier (SC) multiplexing scheme, a multi carrier (MC) multiplexing scheme or a combination thereof is disclosed. Based on various factors such as attributes associated with a UE (user equipment) or availability of resources, a base station can signal to the UE an appropriate multiplexing scheme to be adopted for particular transmissions. The UE can be scheduled for transmission in a semi-static mode wherein the UE employs the transmission scheme for a particular time interval or it may change the mode dynamically for different transmissions. For transmissions from the UE comprising a plurality of data streams with dissimilar attributes, the base station implements a MIMO (multiple input multiple output) system for the UE. This facilitates a UE to dynamically switch between or simultaneously adopt the various multiplexing schemes for communications and thereby fully utilize advantages associated with the different schemes.

52 Claims, 14 Drawing Sheets

(56) References Cited

U.S. PATENT DOCUMENTS

| | | | |
|---|---|---|---|
| 7,885,228 | B2 | 2/2011 | Walton et al. |
| 2003/0003913 | A1* | 1/2003 | Chen et al. ............... 455/436 |
| 2003/0012302 | A1* | 1/2003 | Webster et al. ............ 375/316 |
| 2004/0007712 | A1 | 1/2004 | Von Thun et al. |
| 2004/0162097 | A1* | 8/2004 | Vijayan et al. ............ 455/522 |
| 2005/0053170 | A1* | 3/2005 | Catreux et al. ............ 375/267 |
| 2006/0109931 | A1 | 5/2006 | Asai et al. |
| 2006/0120471 | A1* | 6/2006 | Learned et al. ........... 375/260 |
| 2006/0203932 | A1 | 9/2006 | Palanki et al. |
| 2006/0221894 | A1 | 10/2006 | Casaccia et al. |
| 2006/0223449 | A1 | 10/2006 | Sampath et al. |
| 2007/0041311 | A1* | 2/2007 | Baum et al. ............... 370/208 |
| 2008/0039098 | A1* | 2/2008 | Papasakellariou et al. ... 455/442 |
| 2008/0080545 | A1* | 4/2008 | Wong et al. ............... 370/437 |
| 2009/0147748 | A1 | 6/2009 | Ofuji et al. |

FOREIGN PATENT DOCUMENTS

| | | |
|---|---|---|
| EP | 1175032 | 1/2002 |
| EP | 1398927 | 3/2004 |
| EP | 1865738 | 12/2007 |
| JP | 2004343559 A | 12/2004 |
| JP | 2005020599 A | 1/2005 |
| JP | 2005286508 A | 10/2005 |
| JP | 2006135674 A | 5/2006 |
| JP | 2006287895 A | 10/2006 |
| RU | 2005131622 | 5/2006 |
| RU | 2005132304 | 5/2006 |
| WO | 03034676 | 4/2003 |
| WO | WO2004084450 | 9/2004 |
| WO | WO2004086712 | 10/2004 |
| WO | WO2006023705 | 3/2006 |
| WO | WO2006096784 A1 | 9/2006 |
| WO | WO2006099545 A1 | 9/2006 |
| WO | 2006106616 | 10/2006 |
| WO | WO2006109492 | 10/2006 |
| WO | 2008003087 | 1/2008 |

OTHER PUBLICATIONS

Hyung G. Myung; Junsung Lim; David J. Goodman; , "Single carrier FDMA for uplink wireless transmission," Vehicular Technology Magazine, IEEE , vol. 1, No. 3, pp. 30-38, Sep. 2006.*

Dahlman E et al: "A Framework for Future Radio Access" Vehicular Technology Conference, 2005. VTC 2005-Spring. 2005 IEEE 61ST Stockholm, Sweden Apr. 30-May 1, 2005, Piscataway, NJ, USA, IEEE, May 30, 2005 (May 30, 2005), pp. 2944-2948, XP010855989.

International Search Report and Written Opinion, PCT/US07/083382, International Search Authority—European Patent Office—Apr. 17, 2008.

European Search Report—EP11157538—Search Authority—Munich—Aug. 17, 2011.

Taiwan Search Report—TW096141266—TIPO—Feb. 17, 2012.

Junsung Lim et al., "Channel-Dependent Scheduling of Uplink Single Carrier FDMA Systems" 2006 IEEE 64th Vehicular Technology Conference : VTC 2006-Fall ; Sep. 25-28, 2006, Montreal, Quebec, Canada, Piscataway, NJ : IEEE Operations Center Lnkd—DOI:10.

* cited by examiner

JOINT USE OF MULTI-CARRIER AND SINGLE-CARRIER MULTIPLEXING SCHEMES FOR WIRELESS COMMUNICATION

CROSS-REFERENCE TO RELATED APPLICATIONS

This application claims the benefit of priority under 35 U.S.C. Section 119 from U.S. Provisional Patent Application Ser. No. 60/863,885 entitled "JOINT USE OF MULTI-CARRIER AND SINGLE-CARRIER MULTIPLEXING SCHEMES FOR WIRELESS COMMUNICATION", filed on Nov. 1, 2006, the entirety of which is incorporated hereby by reference.

BACKGROUND OF THE INVENTION

Wireless communication systems are widely deployed to provide various types of communications such as voice, data, video, etc. These systems may be multiple-access systems capable of supporting communication with multiple access terminals by sharing available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems or SC-FDM. Typically, a wireless communication system comprises several base stations, wherein each base station communicates with a mobile station using a forward link and each mobile station (or access terminal) communicates with base station(s) using a reverse link.

Systems based on CDMA are generally more robust in comparison to FDMA systems as they can flexibly increase spreading codes on channels in accordance with bandwidth requirements. Therefore, unlike FDMA systems, they allow channels to be reused among adjacent cells/sectors. However, such channel reuse can decrease capacity of systems besides causing interference at cell/sector boundaries that share the channels. Hence, while CDMA may effectively deliver many low data rate signals like mobile voice, this technology may not be well suited for simultaneous delivery of high speed signals such as broadband data.

OFDM based systems are more effective in dealing with multipath and frequency selective fading in a broadband channel. A frequency selective channel occurs when a transmitted signal experiences a multipath environment where a given received symbol can be potentially corrupted by a number of previous symbols. This phenomenon is generally known as inter symbol interference (ISI). OFDM is based on the idea of frequency-division multiplexing (FDM), which involves sending multiple signals at different frequencies. An OFDM baseband signal is a sum of a number of closely-spaced orthogonal sub-carriers. By utilizing orthogonal frequencies, the sub-carriers within an OFDM system may actually overlap without interfering with each other thereby achieving greater spectral efficiency as compared to FDM. While OFDM systems facilitate servicing several users simultaneously by assigning different sets of orthogonal sub carriers to different users, they suffer from high PAPR (Peak to Average Power Ratio) leading to lower power efficiency. This disadvantage can be overcome by a modified version of OFDM for uplink transmissions in the "long-term evolution (LTE)" of cellular systems called single-carrier FDM (SC-FDM).

SC-FDM systems are similar to OFDM systems as they use different orthogonal frequencies (sub-carriers) to transmit information symbols. However, in contrast to OFDM systems, the information symbols first go through a DFT transformation/spreading before going through the tone mapping and IFFT. This operation reduces the fluctuations in time domain and leads to lower PAPR. Within SC-FDM systems, sub-carriers can be distributed among terminals in accordance with different methods. One method known as localized SC-FDM (LFDM) involves assigning a contiguous set of sub-carriers to a user equipment (UE) to transmit its symbols. Another method is known as interleaved FDM (IFDM) where occupied sub-carriers are equidistant from each other. However, due to various factors SC-FDM can restrict operations which necessitates communication systems/methods that can provide flexibility while optimizing power usage.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later. An apparatus that facilitates flexibility in communication systems is disclosed in accordance with an aspect. It comprises a processor associated with a Node B that indicates to one or more user equipment (UE) to operate in accordance with a multi-carrier multiplexing scheme or a single-carrier multiplexing scheme, and to perform processing for a transmission received from the UE in accordance with the indicated multiplexing scheme. One or more transmitters transmit at least the indication to the one or more UEs. The UEs can transmit their attributes, for example SNRs, to the Node B which can utilize the transmitted attributes to determine an appropriate multiplexing scheme for respective UEs.

According to further aspects, UEs with high SNRs utilize a multi-carrier multiplexing scheme, such as, OFDM, while UEs with low SNRs utilize a single-carrier multiplexing scheme, such as, LFDM. In accordance with a further aspect, the processor associated with the Node B selects the single-carrier multiplexing scheme for single-input multiple-output (SIMO) operation, and the multi-carrier multiplexing scheme for multiple-input multiple output (MIMO) operation.

Another aspect is associated with scheduler operations. As stated supra, while LFDM is associated with low PAPR it restricts scheduler operations since it allows data transmission only on contiguous resources blocks. A scheduler in accordance with various aspects disclosed herein, semi-statically selects the single-carrier multiplexing scheme or the multi-carrier multiplexing scheme for the UE. Based on, for example, SNR associate the UE, the scheduler can either facilitate transmission in OFDM mode for a UE with high SNR or LFDM mode for a UE with low SNR. In accordance with further aspects, a UE can transmit multiple data streams. In this case, the scheduler facilitates transmission of data streams with high SNR in multiple carrier multiplexing scheme like OFDM and data streams with low SNR in single-carrier multiplexing scheme like LFDM.

Thus, based on a selection of the multiplexing scheme other aspects are associated with utilizing a DFT unit in a modulator. The symbols associated with LFDM scheme are transformed using a DFT unit in the modulator while the DFT unit is by-passed when processing symbols in accordance with OFDM scheme. Additionally, the UE is scheduled to transmit on continuous subcarriers for a single-carrier multiplexing scheme while continuous or non-continuous subcarriers can be assigned to the UE for transmissions utilizing a multi-carrier multiplexing scheme.

In accordance with a further aspect, the scheduler can also dynamically select the single-carrier multiplexing scheme or the multi-carrier multiplexing scheme for the UE. It sends an indication of the selected scheme via signaling to the UE. The signaling can comprise a mode bit having a first value to indicate the selection of a multi-carrier multiplexing scheme or a second value to indicate that a single-carrier multiplexing scheme has been selected.

Another aspect relates to receiving transmissions from the UE via multiple antennas, and performing multiple-input multiple-output (MIMO) detection to spatially separate multiple streams sent in the transmission. If multiple data streams are received at the Node B from a UE, the processor can process data streams modulated using single-carrier multiplexing scheme as SIMO and streams modulated with multi-carrier multiplexing scheme as MIMO.

Another aspect relates to a method of wireless communication that includes: sending an indication to a user equipment (UE) to operate in accordance with a multi-carrier multiplexing scheme or a single-carrier multiplexing scheme. A processor at an associated Node B performs processing for a transmission received from the UE in accordance with the indicated multiplexing scheme. A further aspect relates to receiving attributes, for example, SNR values associated with transmissions from the UE. Accordingly, different aspects of the methodology relate to selecting the single-carrier multiplexing scheme for transmissions with a low signal-to-noise ratio (SNR) and selecting the multi-carrier multiplexing scheme for a transmissions with high SNR. A combination of single-carrier and multi-carrier multiplexing schemes as detailed infra is utilized for transmitting a plurality of data streams with different SNR values.

In another aspect, a system is disclosed wherein a processor is configured to receive an indication on whether it should operate in accordance with a multi-carrier multiplexing scheme or a single-carrier multiplexing scheme. Based on the indication it processes data to be transmitted. For example, the data could be processed using a multi-carrier multiplexing scheme such as OFDM wherein data is mapped to one of continuous or discontinuous subcarriers or a single-carrier multiplexing scheme such as LFDM wherein data can be mapped to continuous set of subcarriers. The UE can switch between the two different schemes either semi-statically or dynamically based on the indication received from an associated Node B. In a further aspect, the UE can employ different multiplexing schemes for different layers in a MIMO operation, if it transmits a plurality of data streams having different SNR values.

Other aspects relate to generation of pilot sequences at the UE depending on a selection of the multiplexing scheme. If a single-carrier multiplexing scheme is selected, the processor can generate a first pilot sequence based on a polyphase sequence. Additionally, the processor sends a pilot without data in a single carrier symbol if the single-carrier multiplexing scheme is selected. In contrast, if a multi-carrier multiplexing scheme is selected, data can be multiplexed with the pilot symbols in a single multi-carrier symbol.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE INVENTION

Figure 1:
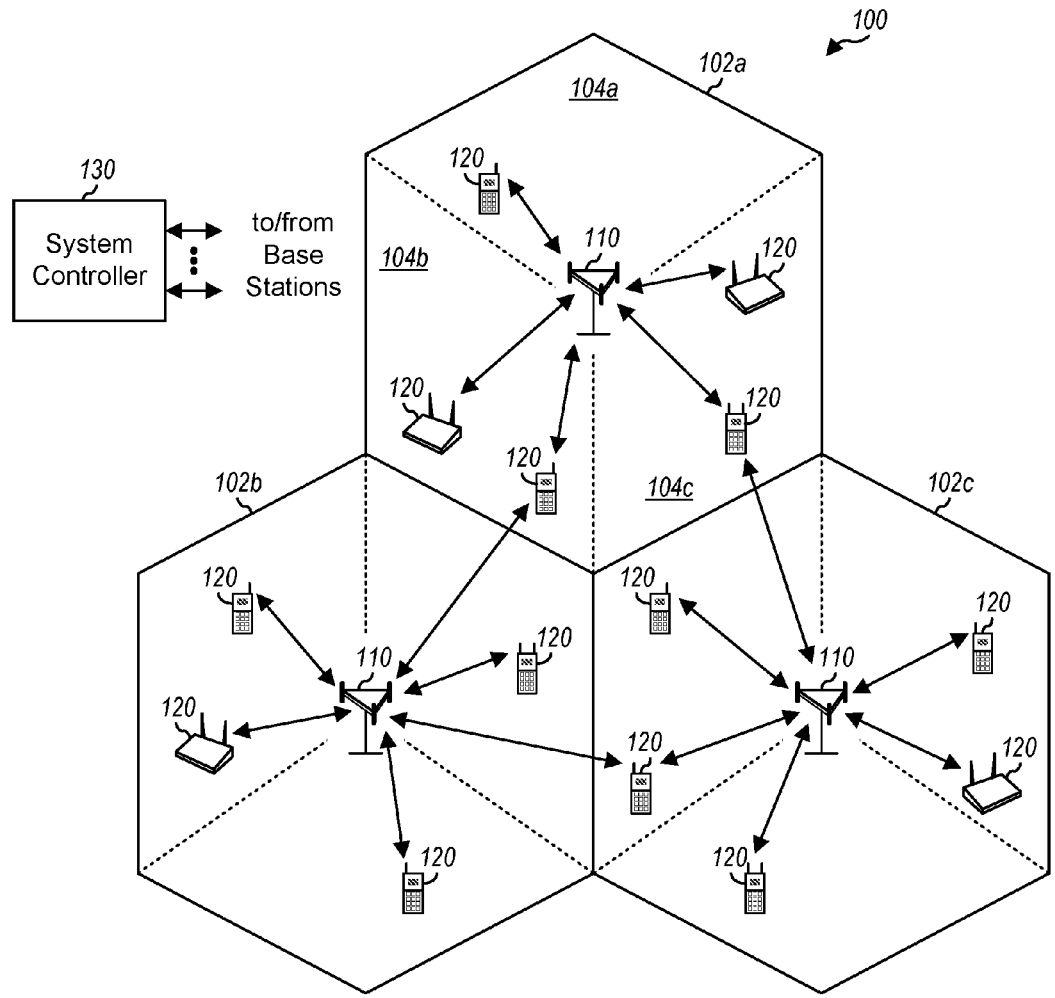
FIG. 1 shows a wireless communication system with multiple Node Bs and multiple user equipments (UEs).

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Various aspects can incorporate inference schemes and/or techniques in connection with transitioning communication resources. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Reducing PAPR is a considerable factor for uplink transmissions where usage of the power amplifier needs to be optimized for UE. Therefore, LFDM is chosen as the transmission waveform for uplinks in LTE due to its low PAR advantage over OFDM waveform in LTE. However, in order to maintain low PAR, each LFDM user has to use a contiguous frequency band, which imposes additional loss and inflexibility in scheduling operations. In comparison, other multiple carrier multiplexing schemes, such as OFDM, provide flexibility as well as greater link efficiency. Various systems and methods of communication are disclosed herein that incorporate both these schemes so that a UE can take advantage of low PAPR associated with one scheme while availing itself of the flexibility associated with the other scheme. Although, specific embodiments have been described with LFDM as the modulation scheme, it can be appreciated that IFDM can also be utilized for modulating signals in order to take advantage of the various aspects detailed herein.

FIG. 1 shows a wireless communication system 100 with multiple Node Bs 110 and multiple user equipments (UEs) 120. A Node B is generally a fixed station that communicates with the UEs and may also be referred to as an enhanced Node B (eNode B), a base station, an access point, etc. Each Node B 110 provides communication coverage for a particular geographic area. The term "cell" can refer to a Node B and/or its coverage area depending on the context in which the term is used. To improve system capacity, a Node B coverage area may be partitioned into multiple smaller areas, e.g., three smaller areas. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the Node B for the cell.

UEs 120 may be dispersed throughout the system. A UE may be stationary or mobile and may also be referred to as a mobile station (MS), a mobile equipment (ME), a terminal, an access terminal (AT), a station (STA), etc. A UE may be a cellular phone, a personal digital assistant (PDA), a wireless communication device, a handheld device, a subscriber unit, a wireless modem, a laptop computer, etc. A UE may communicate with zero, one, or multiple Node Bs on the downlink and/or uplink at any given moment. The downlink (or forward link) refers to the communication link from the Node Bs to the UEs, and the uplink (or reverse link) refers to the communication link from the UEs to the Node Bs. In the following description, the terms "UE" and "user" are used interchangeably.

A system controller 130 may couple to Node Bs 110 and provide coordination and control for these Node Bs. System controller 130 may be a single network entity or a collection of network entities. For a distributed architecture, the Node Bs may communicate with one another as needed. In some aspects, the system may support multiple protocols such as CDMA and OFDMA, which may be used alternately for both RL and FL transmission, or for only one or the other. In addition, in OFDMA communication system one or more ATs may support a CDMA reverse link, along with or in lieu of an OFDM reverse link.

The techniques described herein may be used for various wireless communication systems such as multiple-access communication systems, broadcast systems, wireless local area networks (WLANs), etc. The terms "systems" and "networks" are often used interchangeably. A multiple-access system may utilize a multiple-access scheme such as Code Division Multiple Access (CDMA), Time Division Multiple Access (TDMA), Frequency Division Multiple Access (FDMA), Orthogonal FDMA (OFDMA), Single-Carrier FDMA (SC-FDMA), etc. A multiple-access system may also utilize a combination of multiple-access schemes, e.g., one or more multiple-access schemes for the downlink and one or more multiple-access schemes for the uplink.

Figure 2:
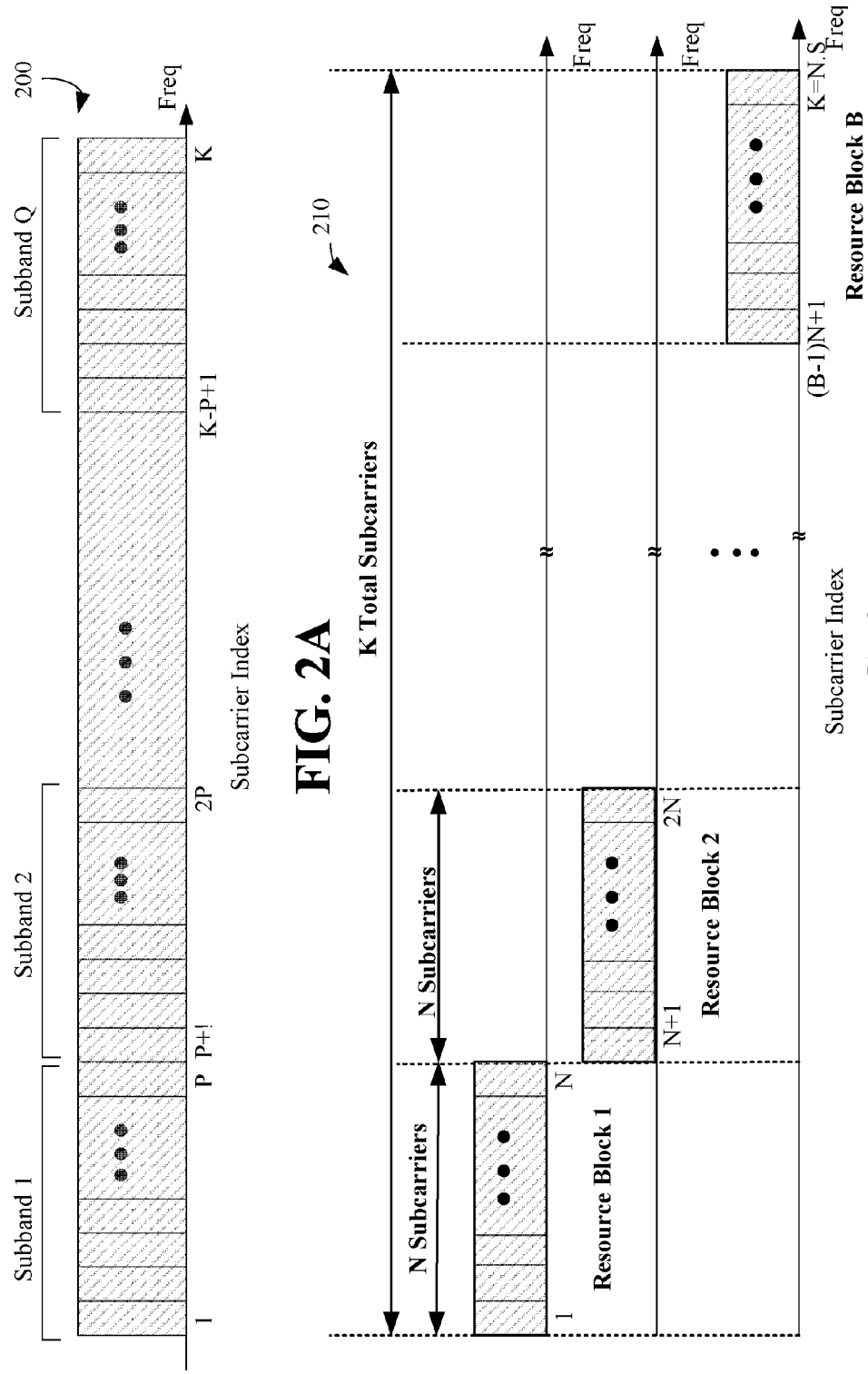
FIG. 2A shows a subcarrier structure that is used for OFDM according to an embodiment.
FIG. 2B shows a subcarrier structure that can be used for SC-FDM in accordance with an aspect.

FIG. 2A shows a subcarrier structure 200 that can be used for OFDM. The system bandwidth is partitioned into K total subcarriers, which may be assigned indices of 1 through K. In general, K can be any integer value but is typically a power of two to simplify computation. K is also referred to as a fast Fourier transform (FFT) size. Only a subset of the K total subcarriers may be usable for transmission, and the remaining subcarriers may be guard subcarriers with no transmission. As a specific example, K may be equal to 512, and 300 subcarriers may be usable for transmission. For simplicity, the following description assumes that all K total subcarriers are usable for transmission. In general, any number of subcarriers and any one of the K total subcarriers may be assigned to a UE and used for OFDM transmission.

The K total subcarriers may be arranged into Q subbands, where Q may be any value. Each subband may include P continuous/consecutive subcarriers, where $P \cdot Q \leq K$. For example, subband 1 may include subcarriers 1 through P, subband 2 may include subcarriers P+1 through 2P, and so on, and subband Q may include subcarriers K−P+1 through K.

FIG. 2B shows a subcarrier structure 210 that may be used for SC-FDM. The K total subcarriers may be arranged into B resource blocks (RBs). Each resource block may include N continuous subcarriers, and resource block b may include subcarriers $(b-1) \cdot N+1$ through $b \cdot N$, for b=1, 2, ..., B. In general, N and B may each be any integer value. As a specific example, N may be equal to 12 and B may be equal to 25 when 300 usable subcarriers are available. A resource block may be the smallest unit of subcarriers that can be allocated to a UE. In this case, a UE may be allocated an integer number of resource blocks. In general, any number of continuous subcarriers may be assigned to a UE and used for LFDM transmission while uniformly separated subcarriers can be assigned to a UE associated with IFDM scheme. Different UEs may be assigned different numbers of subcarriers.

OFDM has certain desirable characteristics, including the ability to combat multipath effects that are prevalent in a terrestrial communication system. However, a major drawback with OFDM is a high peak-to-average power ratio (PAPR) for an OFDM waveform, i.e., the ratio of the peak power to the average power for the OFDM waveform can be high. The high PAPR results from possible in-phase (or coherent) addition of all the subcarriers when they are independently modulated with data. The high PAPR for the OFDM waveform is undesirable and may degrade performance. For example, large peaks in the OFDM waveform may cause a power amplifier to operate in a highly non-linear region or possibly clip, which may then cause intermodulation distortion and other artifacts that can degrade signal quality. To avoid non-linearity, the power amplifier to be operated with backoff at an average power level that is lower than the peak power level. By operating the power amplifier with backoff from peak power, where the backoff may range from 4 to 7 dB, the power amplifier can handle large peaks in the waveform without generating excessive distortion.

As stated supra, SC-FDM (e.g., LFDM or IFDM) has certain desirable characteristics such as robustness against multipath effects, similar to OFDM. Furthermore, SC-FDM does not have a high PAPR since modulation symbols are sent in the time domain with SC-FDM. The PAPR of an SC-FDM waveform is a function of the signal constellation selected for use (e.g., M-PSK—M-ary Phase Shift Keying, M-QAM—Multilevel Quadrature Amplitude Modulation, etc). However, the time-domain modulation symbols in SC-FDM are prone to intersymbol interference due to a non-flat communication channel. Equalization may be performed on the received symbols to mitigate the deleterious effects of intersymbol interference.

In an aspect, OFDM and SC-FDM (e.g., LFDM) may be used for transmission on a given link (e.g., uplink). In general, link efficiency of an OFDM waveform exceeds that of an SC-FDM waveform. The higher link efficiency of OFDM is offset by a larger power amplifier backoff for OFDM than SC-FDM. SC-FDM thus has a low PAPR advantage over OFDM. For UEs with high signal-to-noise ratios (SNRs), the link level gain of OFDM may exceed the PAPR advantage of SC-FDM. By utilizing both OFDM and SC-FDM, the system may benefit from the higher link efficiency of OFDM for high SNR scenarios as well as the PAPR advantage of SC-FDM for low SNR scenarios.

In general, any SC-FDM scheme may be used jointly with OFDM. Furthermore, OFDM and SC-FDM may be jointly used for the uplink, or the downlink, or both the uplink and downlink. For clarity, much of the following description is for joint use of OFDM and LFDM on the uplink.

Figure 3:
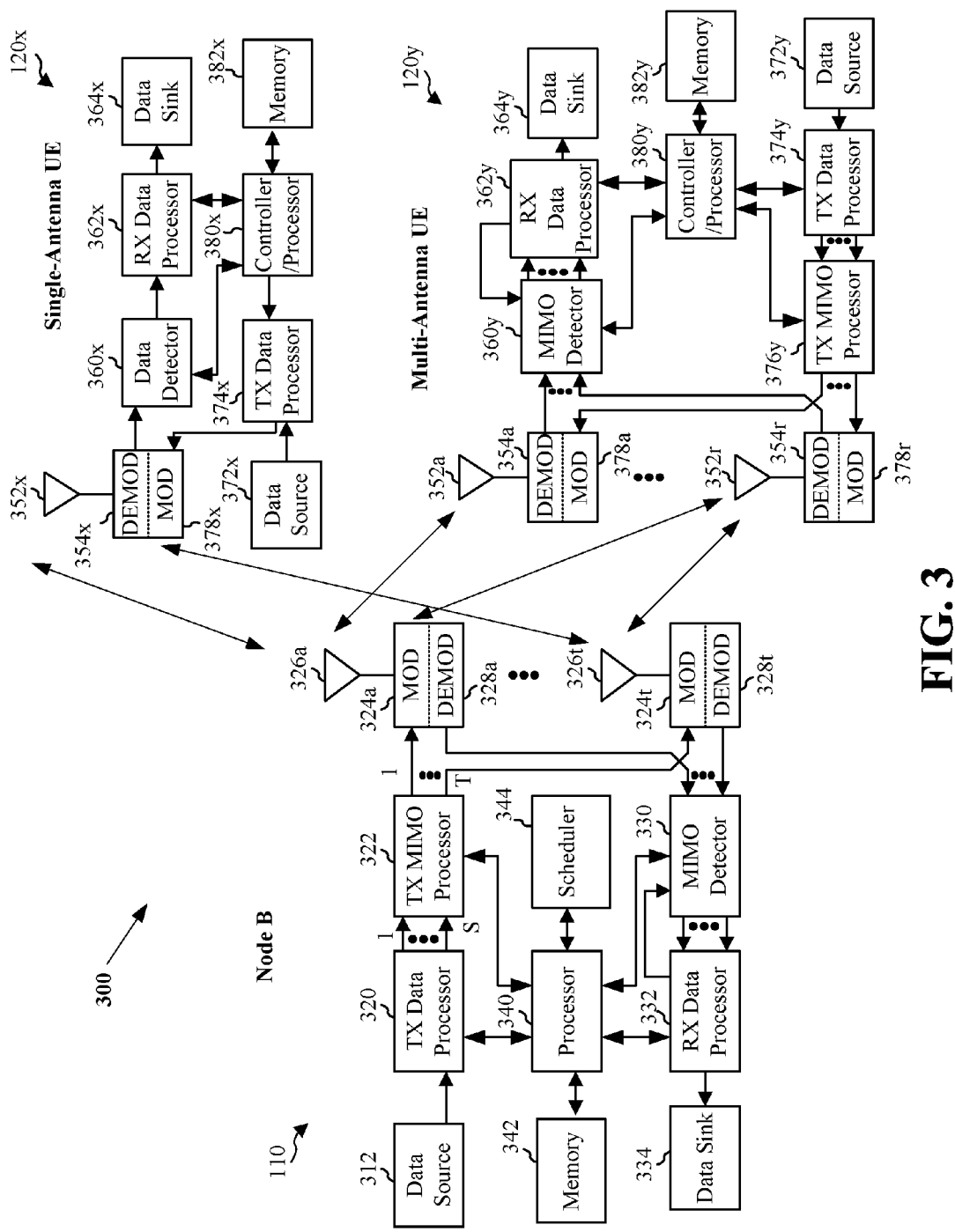
FIG. 3 shows a block diagram of one Node B and two UEs and in system.

FIG. 3 shows a block diagram of one Node B 110 and two UEs 120x and 120y in system 100. Node B 110 is equipped with multiple (T>1) antennas 326a through 326t. UE 120x is equipped with a single (R=1) antenna 352x. UE 120y is equipped with multiple (R>1) antennas 352a through 352r. Each antenna may be a physical antenna or an antenna array.

At Node B 110, a transmit (TX) data processor 320 receives traffic data for the UEs being served from a data source 312 and signaling from a controller/processor 340. TX Processor 320 processes (e.g., formats, encodes, interleaves, and symbol maps) the traffic data and signaling and generates data symbols. TX Processor 320 also generates and multiplexes pilot symbols with the data symbols. As used herein, a data symbol is a symbol for data or signaling, a pilot symbol is a symbol for pilot, and a symbol is typically a complex value. The data symbols and pilot symbols may be modulation symbols from a modulation scheme such as PSK (Phase-shift-keying) or QAM (Quadrature Amplitude Modulation). Pilot symbols may also be generated in other manners. Pilot is data that is known a priori by both the Node B and the UEs.

A TX MIMO processor 322 performs transmitter spatial processing on the data and pilot symbols. Processor 322 may perform direct MIMO mapping, precoding, beamforming, etc. A data symbol may be sent from one antenna for direct MIMO mapping or from multiple antennas for precoding and beamforming. Processor 322 provides T output symbol streams to T modulators (MODs) 324a through 324t. Each modulator 324 performs modulation (e.g., for OFDM, LFDM, etc.) on its output symbols to obtain output samples. Each modulator 324 further processes (e.g., converts to analog, filters, amplifies, and upconverts) its output samples and generates a downlink signal. T downlink signals from modulators 324a through 324t are transmitted from T antennas 326a through 326t, respectively.

At each UE 120, one or multiple antennas 352 receive the downlink signals from Node B 110. Each antenna 352 provides a received signal to a respective demodulator (DEMOD) 354. Each demodulator 354 processes (e.g., filters, amplifies, downconverts, and digitizes) its received signal to obtain received samples. Each demodulator 354 further performs demodulation (e.g., for OFDM, LFDM, etc.) on the received samples to obtain received symbols.

At single-antenna UE 120x, a data detector 360x performs data detection (e.g., matched filtering or equalization) on the received symbols and provides data symbol estimates. A receive (RX) data processor 362x then processes (e.g., symbol demaps, deinterleaves, and decodes) the data symbol estimates and provides decoded data to a data sink 364x and signaling to a controller/processor 380x. At multi-antenna UE 120y, a MIMO detector 360y performs MIMO detection on the received symbols and provides data symbol estimates. An RX data processor 362y then processes the data symbol estimates and provides decoded data to a data sink 364y and signaling to a controller/processor 380y.

UEs 120x and 120y may transmit traffic data, signaling and/or pilot on the uplink to Node B 110. The signaling may include feedback information used for data transmission on the downlink. The feedback information may include, e.g., a precoding matrix selected from a set of precoding matrices, one or more columns of the selected precoding matrix, an SNR estimate or a rate for each data stream, etc. The Node B may use the feedback information to schedule and transmit data to the UEs.

At each UE 120, traffic data from a data source 372 and signaling from controller/processor 380 are processed by a TX data processor 374, further processed by a TX MIMO processor 376 (if applicable), modulated (e.g., for OFDM, LFDM, etc.) and conditioned by one or more modulators 378, and transmitted via one or more antennas 352. At Node B 110, the uplink signals from UEs 120x and 120y are received by antennas 326a through 326t, processed (e.g., for OFDM, LFDM, etc.) by demodulators 328a through 328t, and further processed by a MIMO detector 330 and an RX data processor 332 to recover the traffic data and signaling sent by the UEs. The recovered data is then provided to a data sink 334.

Controllers/processors 340, 380x and 380y may control the operation of various processing units at Node B 110 and UEs 120x and 120y, respectively. Memories 342, 382x and 382y store data and program codes for Node B 110 and UEs 120x and 120y, respectively. A scheduler 344 schedules UEs for downlink and/or uplink transmission, e.g., based on feedback information received from the UEs.

Figure 4A:
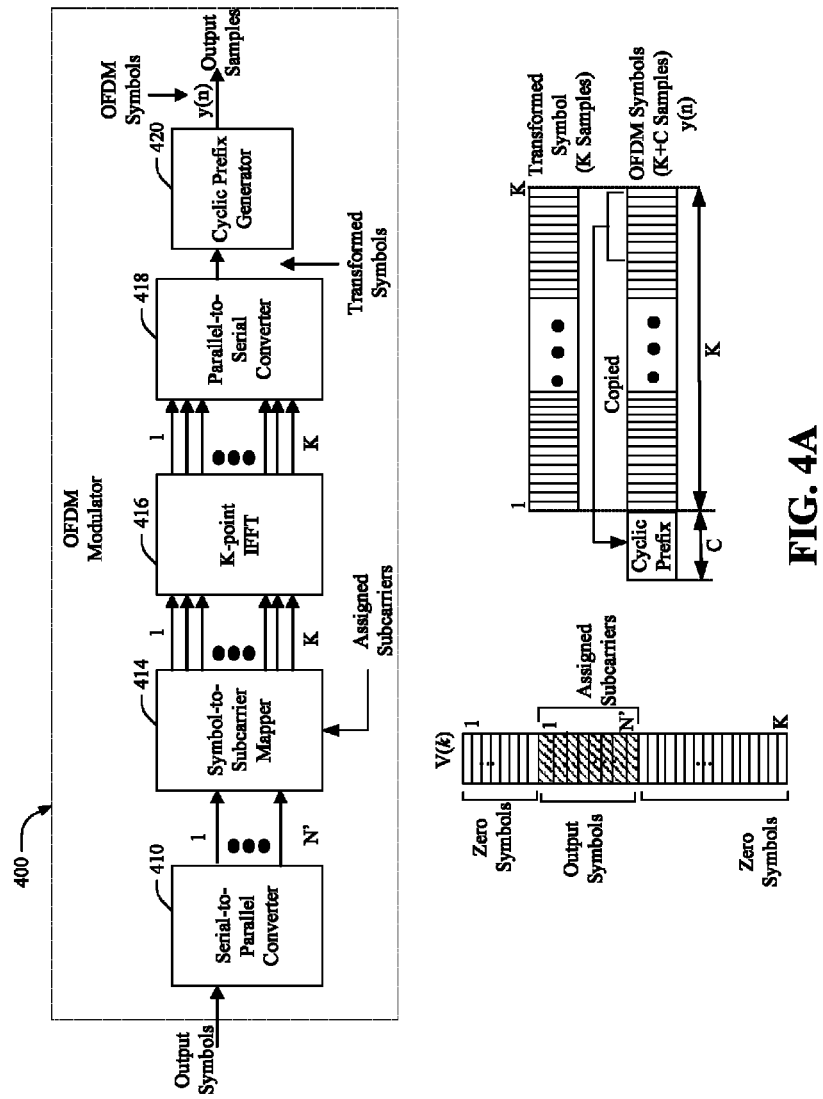
FIG. 4A shows a block diagram of an OFDM modulator which is used in accordance with an aspect.

FIG. 4A shows a block diagram of an OFDM modulator 400, which can be used for each of modulators 324 and 378 in FIG. 3. Within OFDM modulator 400, a serial-to-parallel converter 410 receives output symbols from a TX data processor or a TX MIMO processor and provides these output symbols in parallel form. A symbol-to-subcarrier mapper 414 maps the output symbols to N' subcarriers assigned for transmission and maps zero symbols with signal value of zero to the remaining K−N' subcarriers. The mapped symbols are denoted as V(k), where k is an index for subcarriers. An inverse fast Fourier transform (IFFT) unit 416 receives K symbols for the K total subcarriers in one OFDM symbol period, transforms the K symbols to the time domain with a K-point inverse fast Fourier transform (IFFT), and provides a transformed symbol containing K time-domain samples. Each time-domain sample is a complex value to be sent in one sample period. A parallel-to-serial converter 418 serializes the K samples of the transformed symbol. A cyclic prefix generator 420 cyclically/circularly repeats a portion (or C samples) of the transformed symbol to form an OFDM symbol containing K+C samples. The repeated portion is referred to as a cyclic prefix or a guard interval, and C is the cyclic prefix length. The cyclic prefix is used to combat inter-symbol interference (ISI) caused by frequency selective fading, which is a frequency response that varies across the system bandwidth.

Figure 4B:
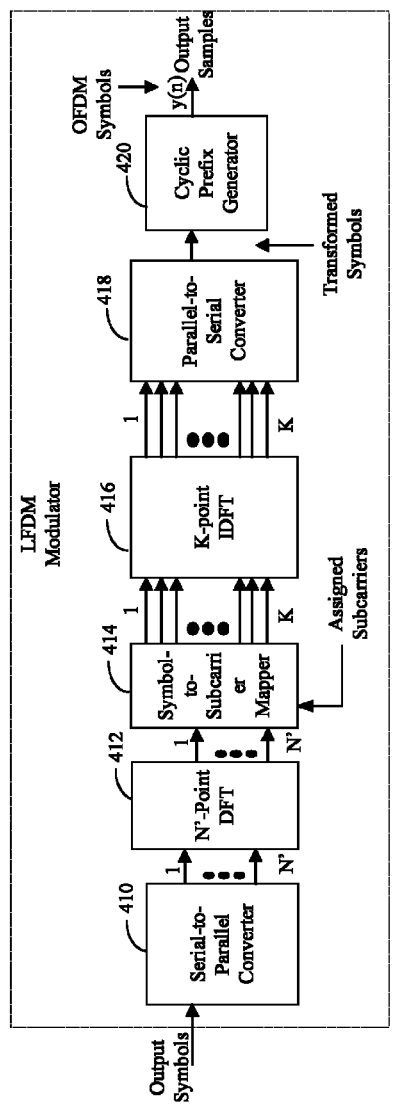
FIG. 4B shows a block diagram of an LFDM modulator which can also be used in accordance with another aspect.

FIG. 4B shows a block diagram of an LFDM modulator 402, which can also be used for each of modulators 324 and 378 in FIG. 3. Within LFDM modulator 402, serial-to-parallel converter 410 receives output symbols and provides these output symbols in parallel form. A discrete Fourier transform (DFT) unit 412 receives N' output symbols for one LFDM symbol period, transforms the N' output symbols from the time domain with an N'-point DFT or fast Fourier transform (FFT), and provides N' frequency-domain symbols. Symbol-to-subcarrier mapper 414 maps the N' frequency-domain symbols to N subcarriers assigned for transmission and maps zero symbols to the remaining K−N' subcarriers. IDFT unit 416 transforms the K symbols to the time domain with a K-point IDFT/IFFT and provides a transformed symbol containing K time-domain samples. Parallel-to-serial converter 418 serializes the K samples of the transformed symbol. Cyclic prefix generator 420 cyclically repeats C samples of the transformed symbol to form an LFDM symbol containing K+C samples.

As shown in FIGS. 4A and 4B, both OFDM and LFDM may be supported with units 410 through 420 in FIG. 4B. All units are used for LFDM whereas DFT unit 412 is bypassed for OFDM. For example, in accordance with certain aspects that will be detailed infra, the Node B can indicate to the UEs the mode of operation and based on such indications the UE may or may not employ DFT units 412 as described herein. As stated supra, although the embodiments in FIGS. 4A and 4B have been described with respect to LFDM, it can be appreciated that another form of SC-FDM known as IFDM, can also be utilized as a modulation scheme wherein different UE are mapped onto equi-spaced subcarriers.

Figure 5A:
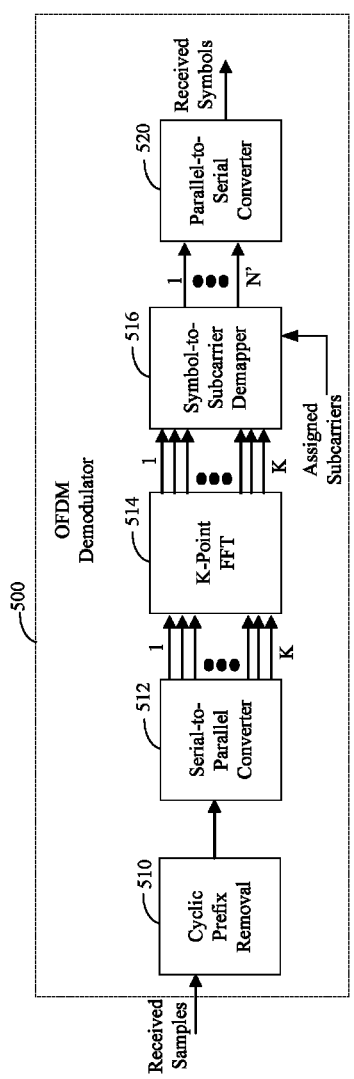
FIG. 5A shows a block diagram of an OFDM demodulator.

FIG. 5A shows a block diagram of an OFDM demodulator 500, which may be used for each of demodulators 328 and 354 in FIG. 3. Within OFDM demodulator 500, a cyclic prefix removal unit 510 obtains K+C received samples in one OFDM symbol period, removes C samples for the cyclic prefix, and provides K received samples. A serial-to-parallel converter 512 provides the K received samples in parallel form. An FFT unit 514 transforms the K received samples to the frequency domain with a K-point FFT and provides K received symbols for the K total subcarriers. A symbol-to-subcarrier demapper 516 obtains K received symbols and provides N' received symbols from the N subcarriers assigned for transmission. A parallel-to-serial converter 520 serializes the N' received symbols from unit 516.

Figure 5B:
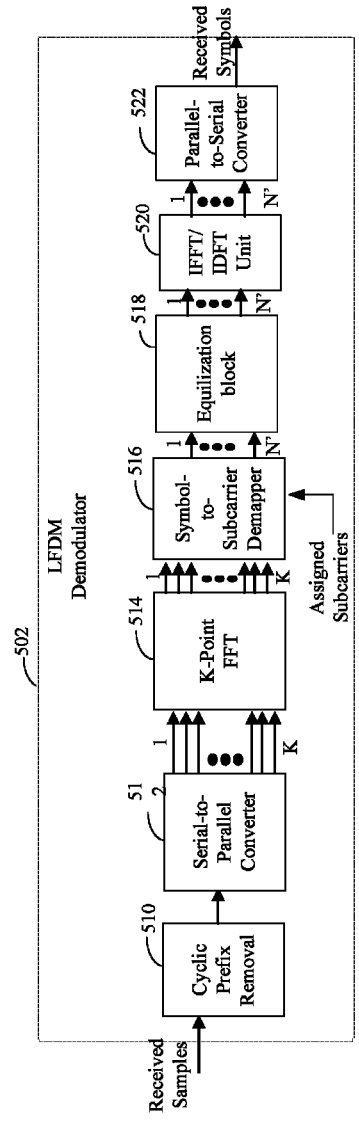
FIG. 5B illustrates a block diagram of an LFDM demodulator.

FIG. 5B shows a block diagram of an LFDM demodulator 502, which may also be used for each of demodulators 328 and 354 in FIG. 3. Within LFDM demodulator 502, cyclic prefix removal unit 510 obtains K+C received samples in one LFDM symbol period, removes C samples for the cyclic prefix, and provides K received samples. Serial-to-parallel converter 512 provides the K received samples in parallel form. FFT unit 514 transforms the K received samples with a K-point FFT and provides K frequency-domain symbols for the K total subcarriers. Symbol-to-subcarrier demapper 516 obtains K frequency-domain symbols and provides N' frequency-domain symbols from the N' subcarriers assigned for transmission to an equalizer 518. An IFFT unit 520 transforms the N' frequency-domain symbols to the time domain with an N'-point IFFT/IDFT and provides N' received symbols. Parallel-to-serial converter 522 serializes the N' received symbols.

As shown in FIGS. 5A and 5B, both OFDM and LFDM may be supported with units 510 through 522 in FIG. 5B. All units are used for LFDM whereas IDFT/IFFT unit 520 is bypassed for OFDM.

In view of exemplary aspects described herein, methodologies that can be implemented in accordance with the disclosed subject matter are discussed. While, for purposes of simplicity, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement respective methodologies. It is to be appreciated that the functionality associated with various blocks may be implemented by software, hardware, a combination thereof or any other suitable means (e.g., device, system, process, component). Additionally, it should be further appreciated that some methodologies disclosed hereinafter and throughout this specification are capable of being stored on an article of manufacture to facilitate transporting and transferring such methodologies to various devices. Those skilled in the art will appreciate and understand that a methodology can alternatively be represented as a series of interrelated states or events such as for example in a state diagram.

Joint operation of OFDM and LFDM/IFDM may be supported in various manners. In one design, a UE may be configured to operate in an OFDM mode or an LFDM/IFDM mode, which may be considered as different transmission modes. In the OFDM mode, the UE transmits on the uplink using OFDM. In the LFDM/IFDM mode, the UE transmits on the uplink using LFDM or IFDM respectively. An OFDM UE or OFDM user is a UE configured to operate in the OFDM mode. An LFDM or IFDM UE or LFDM/IFDM user is a UE configured to operate in the LFDM mode.

Figure 6:
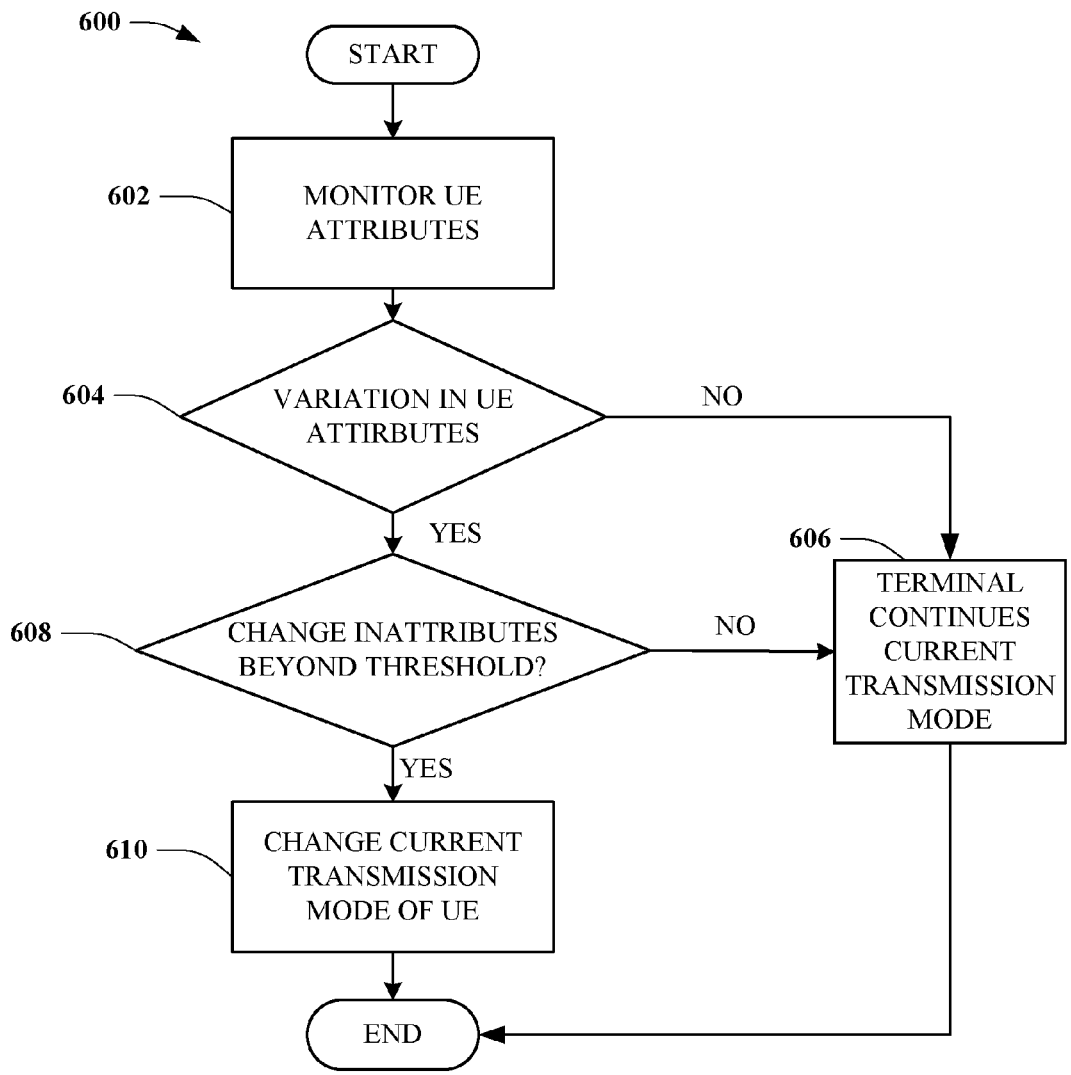
FIG. 6 illustrates an aspect which is referred to as semi-static separation, wherein a UE is configured for operation in the OFDM mode or LFDM mode in accordance with different aspects.

FIG. 6 illustrates a methodology of communication 600 in accordance with an aspect, wherein a UE is configured for operation in the OFDM mode or LFDM mode in a semi-static manner. The mode selection may be based on various criteria and the UE transmits in accordance with the selected mode for a particular time interval which can be predetermined or the mode may change with variations in UE attributes as further detailed infra. For example, UEs with low SNRs or low geometry may be configured for LFDM. These UEs may operate their power amplifiers near 100% utilization in order to meet link budget. LFDM may be more efficient than OFDM for these UEs. UEs with higher SNRs or high geometry may be configured for OFDM. These UEs may have their transmit power adjusted by load indicators from other cells and may not be constrained by the power amplifier backoff. OFDM may provide higher link efficiency for these UEs.

In accordance with the aspect described in FIG. 6, a Node B/access point can be continuously monitoring attributes of one or more UEs within its associated cell at 602. For example, a UE upon initially entering the cell may have low SNR as it is on the fringes of the cell. Accordingly, the Node B associated with the cell may initially set the UE to transmit in a LFDM mode. Upon traversing further into the cell the SNR of the UE may gradually improve. In a converse scenario, a UE may initially be located close to the Node B and have a high SNR but it may move farther away from the Node B and as a result its SNR may gradually deteriorate. Any such changes in the observed attributes of the UEs are detected by the Node B at 604. If there are no changes in the attributes of an observed UE, it maintains its current transmission mode as indicated at 606. However, if changes are detected at 604, then they are compared to a predetermined threshold to determine if there should be a corresponding change in the transmission mode of the UE at 608. If the changes are within the predetermined threshold values, the UE can maintain current transmission mode as indicated at 606. If however, the change in attributes like SNR conditions of a UE under observation varies beyond the threshold, the Node B then initiates a corresponding change in its transmission mode as indicated at 610. In accordance with an aspect, the Node B can initiate the change by transmitting a control bit which has specific values for each or the transmission modes. For example, with respect to the scenarios described above, a UE that is moving closer to the Node B can switch from the initial LFDM transmission mode to OFDM transmission mode thereby gaining advantages associated with the OFDM scheme. Similarly, a UE moving away from Node B may switch its initial OFDM transmission mode to an LFDM transmission mode based on the signal/mode bit received from the corresponding Node B. A Node B may send signaling to inform the UE to use either OFDM or LFDM.

Figure 7:
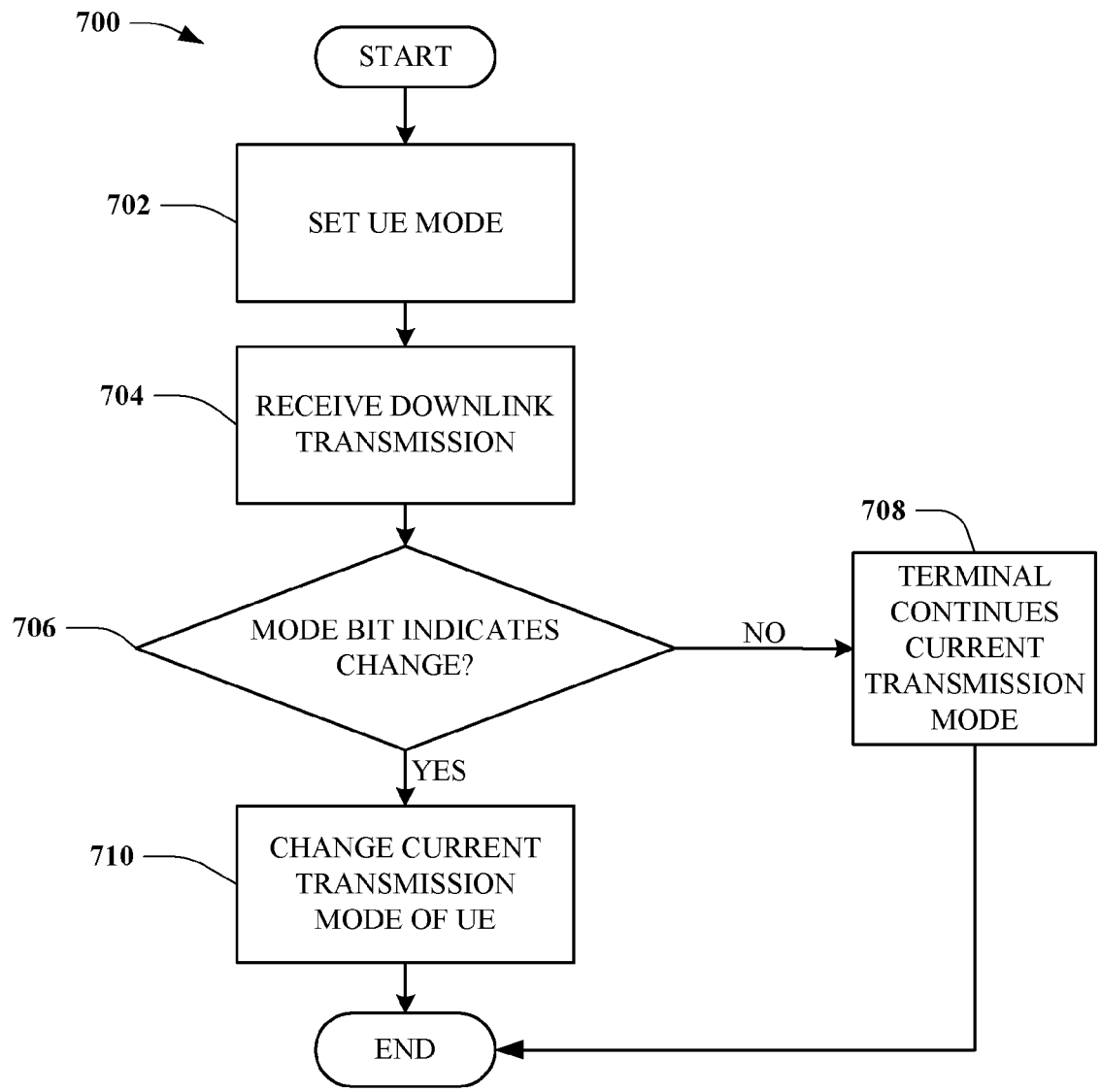
FIG. 7 is a methodology of communication associated with a different aspect, which is referred to as dynamic scheduling.

FIG. 7 is a methodology of communication 700 associated with a different aspect, which is referred to as dynamic scheduling. In accordance with this aspect a UE can be configured for operation in the OFDM mode or LFDM mode in a dynamic manner, e.g., in each scheduling interval or some other time duration. A Node B can send signaling to inform the UE to use either OFDM or LFDM. Accordingly, at 702, a UE is operating in an initial mode which may have been determined based on its SNR conditions etc. At 704, it receives a down link transmission from a servicing Node B which can comprise a mode bit as stated supra, to indicate the transmission mode in which the UE should operate. Hence, at 706, it examines the mode bit in order to determine if a change is required in its transmission mode. For example, the signaling may comprise one mode bit in a downlink control message to indicate the particular transmission mode to use for uplink transmission. This mode bit may be set, e.g., (a) to '0' to indicate LFDM mode or (b) to '1' to indicate OFDM mode. Accordingly, if a particular UE receives a bit indicating a certain mode which is the same as its current mode, it continues to maintain its current mode as shown at 708. If the bit indicates a mode different from its current mode, the UE will switch its mode of transmission based on the value of the bit received as indicated at step 710. It is to be appreciated that switching modes in accordance with dynamic scheduling takes place at a much faster rate as compared to semi-static separation of UEs described with respect to FIG. 6. Further, it can be appreciated that a UE may be configured by the Node B to switch modes based on various aspects comprising availability of contiguous resources, power amplifier headroom, or SNR as detailed supra. For example, if a UE is initially configured to transmit in LFDM mode and there is a paucity of contiguous subcarriers, the Node B can then direct to UE to transmit in OFDM mode based on availability of discontinuous subcarriers. Thus, the system can take advantage of various aspects associated with SC-FDM as well as OFDM schemes.

Figure 8:
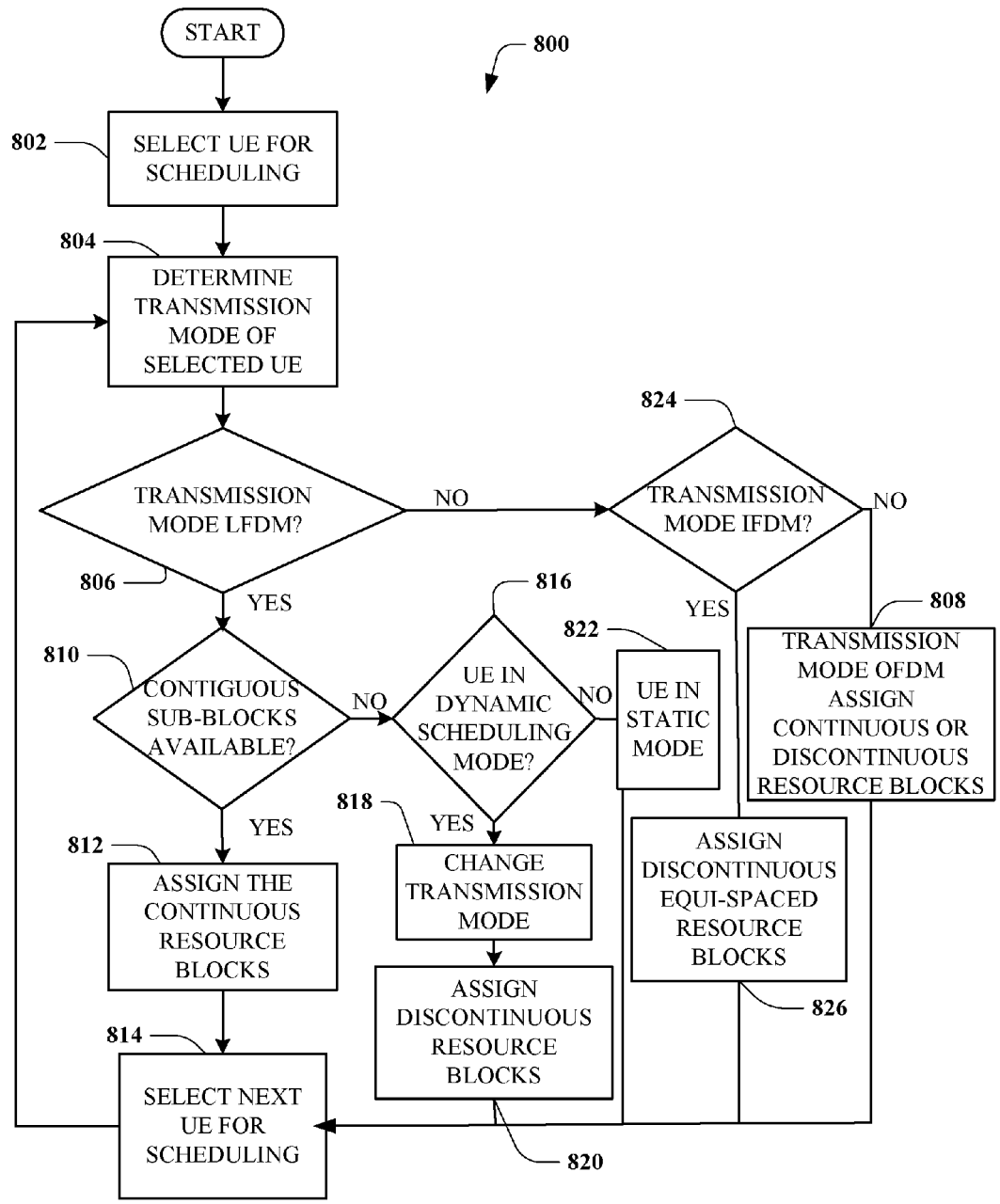
FIG. 8 is a flow chart that details operation of a scheduler in accordance with an aspect.

FIG. 8 is a flow chart 800 that details operation of a scheduler in accordance with an aspect. While operating under semi-static separation or dynamic scheduling, a scheduler (e.g., scheduler 344 in FIG. 3) may assign continuous subcarriers to a UE operating in the LFDM mode or equi-spaced tones to a UE in IFDM mode in order to maintain low PAPR and may assign continuous or discontinuous subcarriers to a UE operating in the OFDM mode. The scheduler has full flexibility in resource block assignment for the OFDM mode. In accordance with different aspects, the scheduler can schedule UEs for transmission in various manners. In accordance with the aspect depicted in FIG. 8, the scheduler selects one UE at a time for assignment of transmission resources based on their priorities in a descending manner. Therefore, a UE with highest priority is selected for scheduling at 802. At 804, the scheduler determines the transmission mode of the UE is LFDM or OFDM. As illustrated at step 806, if the transmission mode is LFDM, then only continuous RBs should be allocated to it. If the transmission mode is not LFDM, it is again determined at 824 if the UE is in IFDM mode. If it is in IFDM transmission mode, then discontinuous but equi-spaced resource blocks are assigned to it as show at 826 and the process terminates with the scheduler selecting a next UE at 814. If the UE is not in IFDM mode, it is concluded at 810 that the transmission mode is OFDM and therefore the scheduler can allocate continuous or discontinuous resource blocks to the UE as shown at step 808. Subsequently, at 814 the scheduler selects a next UE that should be assigned transmission resources. If however, it is determined at step 806 that the UE is in a LFDM transmission mode, the scheduler again determines if there are contiguous RBs available to assign to the UE at 810. If they are available, the UE is assigned to these resources at 812 and the process concludes at 814 where the scheduler selects a next UE scheduling. However, if it is concluded at 810 that there are no continuous RBs available for scheduling then it is further determined if the UE is in a dynamic scheduling mode as shown at 816. If the UE is not in a dynamic scheduling mode, then it is concluded that the UE is in a static scheduling mode at 822 and therefore the mode of the UE may not be changed. Hence, the process terminates at 814 wherein a next UE is selected for scheduling. If however, the UE is in a dynamic scheduling mode, the transmission mode of the UE is changed to OFDM transmission mode as shown at 818. As stated supra, the mode can be changed to OFDM to better utilize discontinuous resources. Accordingly, discontinuous resource blocks that may be available are assigned to the UE at 820 and the process terminates at 814 with the scheduler selecting a next UE to assign transmission resources.

The scheduler may use a channel tree with continuous resource block mapping for LFDM. The scheduler may use another channel tree to allocate disjoint resource blocks for OFDM. This may provide the scheduler with more flexibility to allocate the resource blocks to efficiently utilize the entire system bandwidth. In general, the scheduler may use any number of channel trees, and each channel tree may have any mapping of resource blocks to nodes. The scheduler may use the same or different channel trees for OFDM and LFDM.

Figure 9:
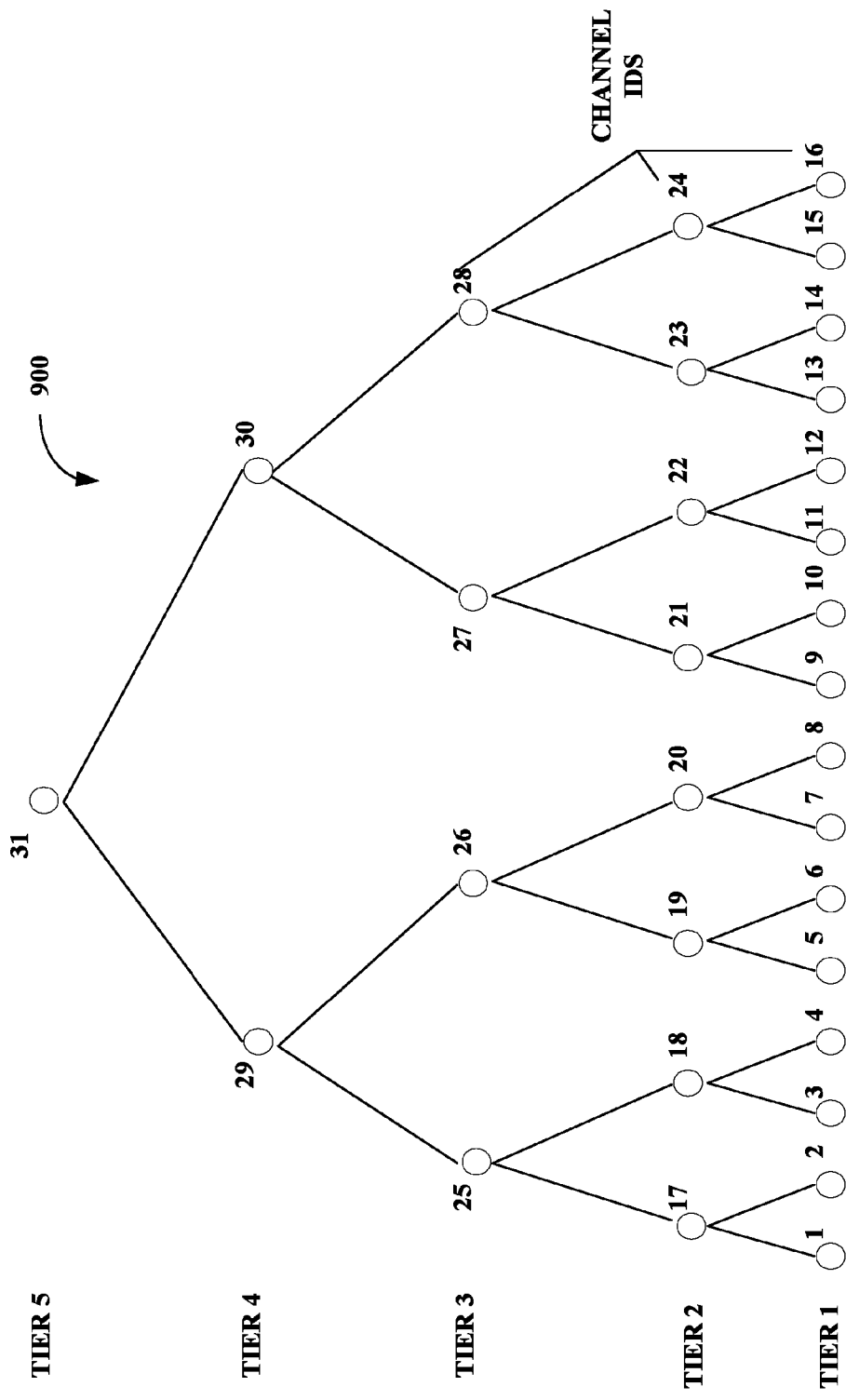
FIG. 9 illustrates a diagram of a channel tree comprising B=16 subcarrier sets in the first tier that can be used to assign resource blocks in accordance with an aspect.

FIG. 9 is a diagram of a channel tree 900 that can be used by the scheduler to assign resource blocks in accordance with an aspect comprising B=16 subcarrier sets in the first tier. A set of traffic channels may be defined with the B subcarrier sets. Each traffic channel is assigned a unique channel ID and is mapped to one or more subcarrier sets in each time interval. For example, a traffic channel may be defined for each node in channel tree 900. The traffic channels may be sequentially numbered from bottom to top and from left to right for each tier. The largest traffic channel corresponding to the topmost node is assigned a channel ID of 2B−1 and is mapped to all B subcarrier sets. The B traffic channels in the lowest tier 1 have channel IDs of 1 through B and are called base traffic channels. Each base traffic channel is mapped to one subcarrier set. The tree structure as shown herein places certain restrictions on the use of the traffic channels for an orthogonal system. For each traffic channel that is assigned, all traffic channels that are subsets (or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time.

As stated supra, one or more channel trees may be defined and used for resource allocation. A channel tree maps specific available resources blocks to nodes of the channel tree. For example, a binary channel tree can be defined in which resource blocks 1 through B may be mapped to nodes 1 through B, respectively, in the first tier of the channel tree. In the second tier, resource blocks 1 and 2 may be mapped to nodes B+1, etc., and resource blocks B−1 and B may be mapped to node B+B/2. In the third tier, resource blocks 1 to 4 can be mapped to nodes B+B/2+1, etc., and resource blocks B−3 through B may be mapped to node B+3B/4. A UE may be assigned a specific node in the channel tree and may use all resource blocks mapped to the assigned node. The channel tree provides a convenient mechanism for assigning resources and signaling the assigned resources.

Figure 10:
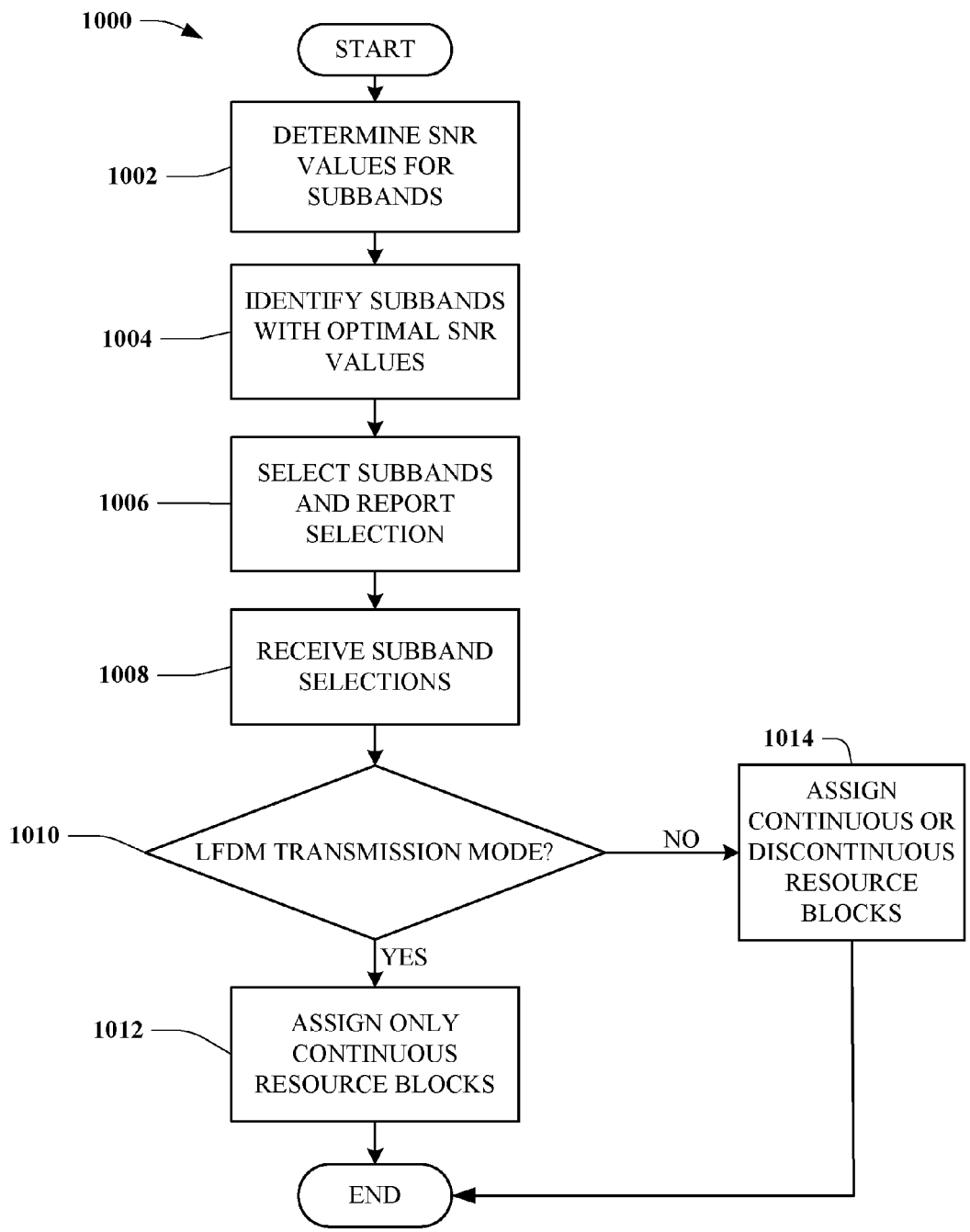
FIG. 10 is a flow chart illustrating a methodology of scheduling using subbands to improve performance.

FIG. 10 is a flow chart illustrating a methodology of scheduling 1000 using subbands to improve performance in communication systems. In accordance with this aspect, UEs can select subbands with best SNRs to be scheduled on by the scheduler at an associated Node B. Initially at 1002, the UEs being served by a scheduler estimate SNRs for different subbands for communication. At 1004, one or more subbands with optimal SNRs are identified. At 1006, the UEs select such subbands and report them to the scheduler. At 1008, the scheduler receives such reports from the UEs and may attempt to schedule the UEs on based their respective selections. Upon determining the transmission mode of the UE at 1010, the scheduler can schedule the UE in contiguous subbands if it is in LFDM mode as shown at step 1012. If the UE is in OFDM mode, it can be scheduled in multiple disjoint subbands as seen at 1014. Thus, while operating in OFDM mode the UE is able to achieve full subband scheduling gain.

In accordance with various other aspects, system may support single-input single-output (SISO), single-input multiple-output (SIMO), multiple-input single-output (MISO), and/or multiple-input multiple-output (MIMO) operation. Single-input refers to one transmit antenna and multiple-input refers to multiple transmit antennas for data transmission. Single-output refers to one receive antenna and multiple-output refers to multiple receive antennas for data reception. On the downlink, the multiple transmit antennas are at a Node B, the multiple receive antennas may be at one or more UEs. On the uplink, the multiple transmit antennas may be at one or more UEs, and the multiple receive antennas are at the Node B. The system may also support single-user MIMO (SU-MIMO) and multi-user MIMO (MU-MIMO). SU-MIMO refers to MIMO transmission to/from a single UE. MU-MIMO refers to MIMO transmission to/from multiple UEs, e.g., on the same set of subcarriers. MU-MIMO is also referred to as Spatial Division Multiple Access (SDMA). SU-MIMO and/or MU-MIMO may be supported on the downlink and/or uplink.

Figure 11:
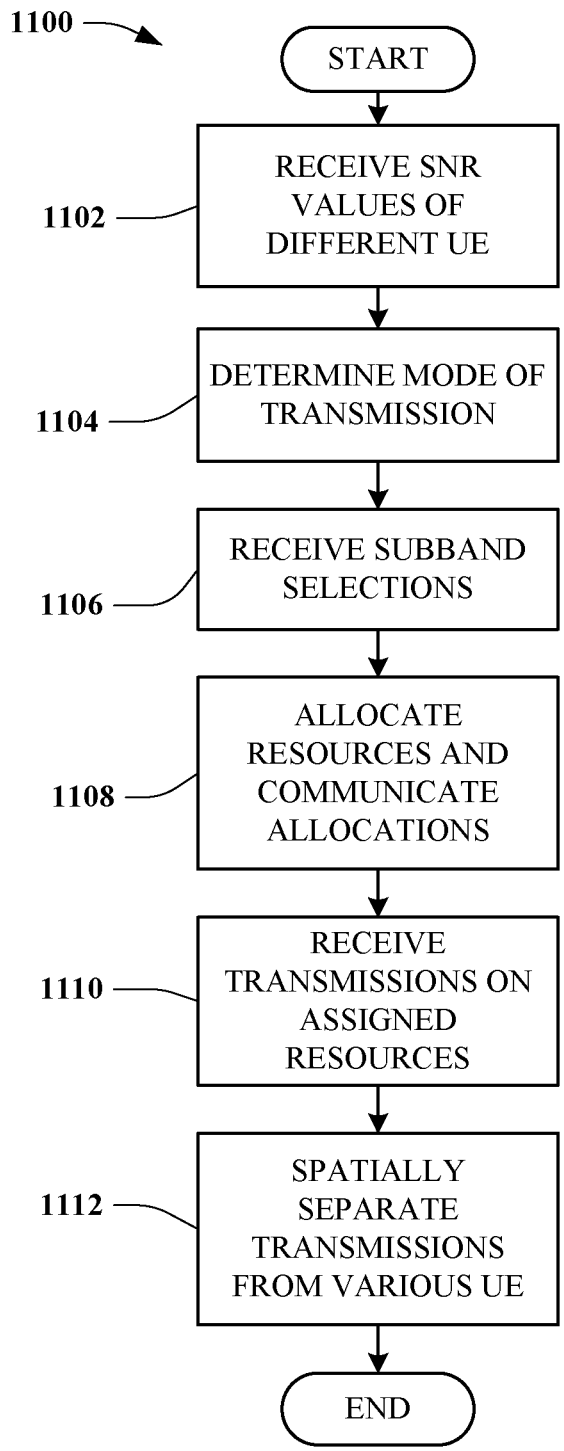
FIG. 11 is a methodology of communication that utilizes various aspects described herein to implement OFDM/LFDM schemes within a MU-MIMO system in order to take advantage of features within both the systems.

FIG. 11 is a methodology of communication 1100 that utilizes various aspects described herein to implement OFDM/LFDM schemes within a MU-MIMO system in order to take advantage of features within both the schemes. Initially at 1102, receivers at a Node B receive SNRs associated with various UEs operating within its cell. An associated processor (e.g., processor 340 in FIG. 3) can analyze the SNRs to determine a mode of operation for the transmitting UEs at 1104. Accordingly, the UEs can be allowed to operate in OFDM/LFDM modes either semi-statically or dynamically as detailed supra. At 1106, the Node B also receives broad band sounding signal from the UE and makes subband selections from the associated UEs. Based on the received selections and/or modes of operation of UEs the Node B determines subband scheduling and thereby allocates contiguous RBs or disjoint RBs from different channel trees and communicates such allocations to UEs as seen at step 1108. At 1110, the Node B may further receive data and/or control transmissions from the UEs on the assigned resources. These transmissions can be received through a plurality of receive antennae. At 1112, the transmissions thus received from the UEs are spatially separated using MIMO techniques like MMSE (minimum mean square error) detection, which may be used with successive interference cancellation (SIC). In accordance with further aspects as detailed infra, a given UE can use OFDM and LFDM transmission modes simultaneously on two different data streams based on various criteria, such as, SNRs associated with the respective data streams. Accordingly various modes can be adopted by a given UE for communications such as SIMO/OFDM, SIMO/LFDM, MIMO/OFDM, MIMO/LFDM, SDMA/LFDM/OFDM or combinations thereof.

Figure 12:
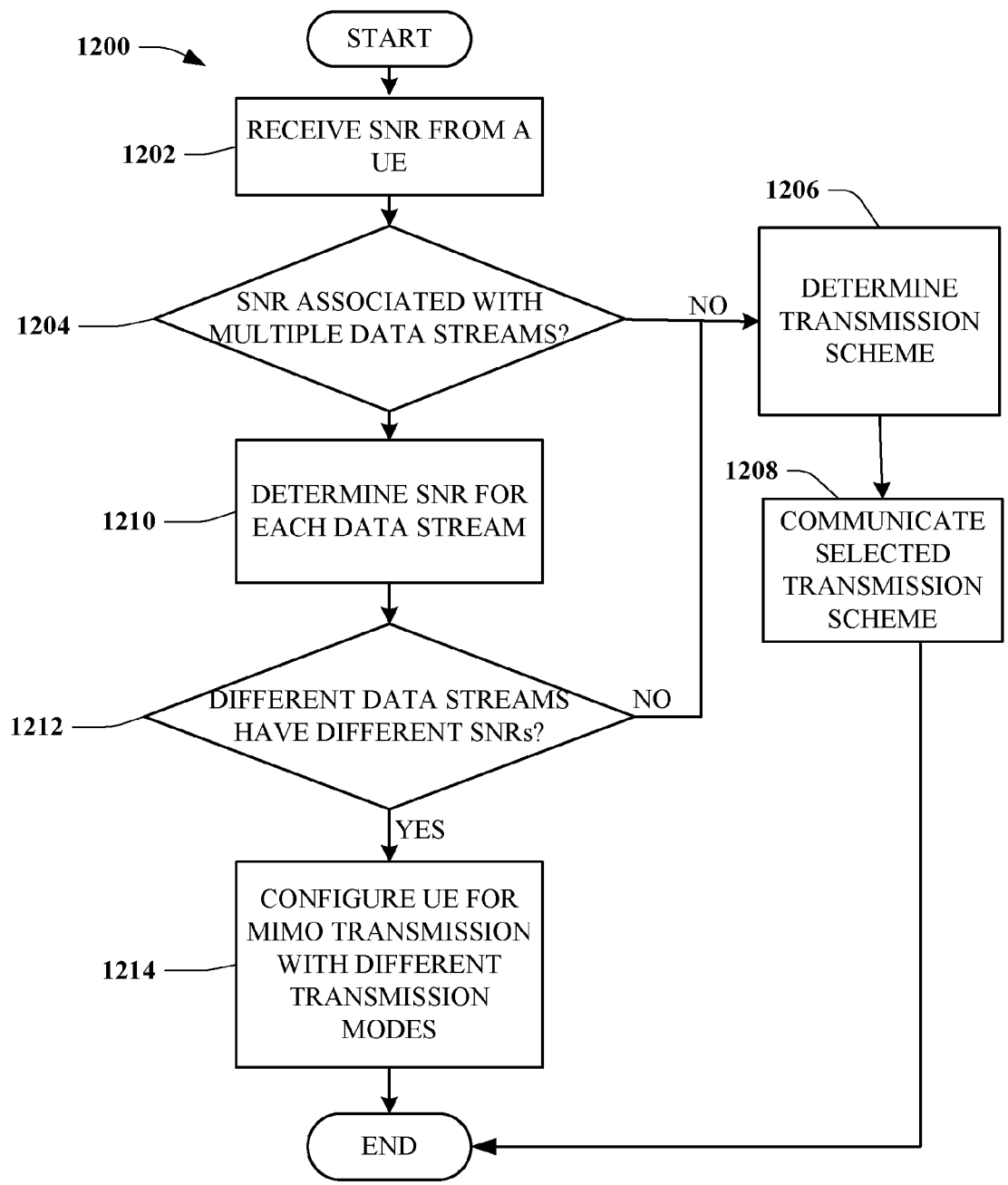
FIG. 12 illustrates another aspect that relates to incorporating the advantages of OFDM/LFDM schemes within a communication system.

Another aspect that relates to incorporating the advantages of OFDM/LFDM schemes within a communication system is disclosed in the flow chart 1200 illustrated in FIG. 12. A communication procedure is disclosed wherein a serving Node B initially receives a transmission conveying SNR from a single UE as shown at 1202. In accordance with a further aspect, the UE may be configured to transmit a plurality data streams that can have different SNR values associated therewith. Accordingly, at 1204, a determination is made at the Node B if the SNRs received from the UE are associated with multiple data streams. If the SNR is associated with only a single data stream transmission, then at 1206, the Node B will determine the transmission scheme for the UE based on the received SNR as described supra. Thus, if the data stream has a high SNR the Node B will configure the UE to transmit the data stream as an OFDM waveform whereas if the data stream has a low SNR the UE will be configured to transmit it as a LFDM waveform. It should be noted that the scheduler at the Node B can operate in a semi-static separation mode as detailed supra. At 1208, the Node B communicates information regarding the scheme to be used for transmission to the UE and the process terminates at the stop block. If however, it is determined at 1204 that the SNRs received from UE are associated with different data streams, SNRs of each data stream that will be transmitted by the UE at determined at 1210. At 1212, the SNRs from step 1210 are examined to determine if different data streams have different SNRs associated therewith. If all data streams have similar SNR values then the Node B will configure the UE to operate in accordance with one of the transmission schemes. Hence, the process can return to 1206. If however, different data streams have different SNR values, the UE is configured for a MIMO transmission at 1214 wherein different data streams have different transmission modes depending on their respective SNR values. For example, the UE may use OFDM for streams with high SNRs and may use LFDM for streams with low SNRs, e.g., a modulation coding scheme (MCS) with QPSK. This allows for flexibility in using LFDM and/or OFDM for different layers/UEs.

Higher throughput or spectral efficiency may be achieved with MIMO under certain channel conditions, e.g., high SNRs, less correlation between the transmit and receive antennas, etc. Improved reliability may be achieved with SIMO under other channel conditions, e.g., low SNRs. MIMO or SIMO may be selected based on one or more criteria, e.g., SNRs. In accordance with a further aspect, to simplify operation, OFDM is used with MIMO (which may be selected when high SNRs are observed) and LFDM is used with SIMO.

For both OFDM and LFDM, a UE may transmit pilot on the uplink to assist a Node B with detection. In general, the same or different pilots may be used for OFDM and LFDM. In one design, a pilot for LFDM is generated based on a polyphase sequence, which is a sequence having good temporal characteristics (e.g., a constant time-domain envelope) and good spectral characteristics (e.g., a flat frequency spectrum). For example, pilot symbols may be generated as follows:

$$p_i = e^{j\phi_i}, \text{ for } i=1, \ldots, L, \qquad \text{Eq (1)}$$

where $p_i$ is a pilot symbol for time i, $\phi_i$ is the phase for time i, and L is the pilot sequence length Phase $\phi_i$ may be derived based on any one of the following:

$$\varphi_i = \pi \cdot (i-1) \cdot i, \qquad \text{Eq (2)}$$

$$\varphi_i = \pi \cdot (i-1)^2, \qquad \text{Eq (3)}$$

$$\varphi_i = \pi \cdot [(i-1) \cdot (i-L-1)], \qquad \text{Eq (4)}$$

$$\varphi_i = \begin{cases} \pi \cdot (i-1)^2 \cdot F/L & \text{for } L \text{ even,} \\ \pi \cdot (i-1) \cdot n \cdot F/L & \text{for } L \text{ odd.} \end{cases} \qquad \text{Eq (5)}$$

In equation (5), F and L are relatively prime. Equation (2) is for a Golomb sequence, equation (3) is for a P3 sequence, equation (4) is for a P4 sequence, and equation (5) is for a Chu sequence. The P3, P4 and Chu sequences can have any arbitrary length. The pilot symbols may also be generated based on a Frank sequence, a P1 sequence, a Px sequence, or some other polyphase sequence. The use of a polyphase sequence may result in low PAPR for the pilot.

The pilots for LFDM and OFDM may also be generated with modulation symbols from any modulation scheme (e.g., QPSK), which may simplify processing for the pilots. Different sequences of pilot symbols may be used for OFDM and LFDM to simplify network planning.

Pilots may be transmitted in various manners for OFDM and LFDM. In one design, pilot and data are transmitted in a time division multiplexed (TDM) manner. For example, data may be transmitted in one or more OFDM/LFDM symbols, then pilot may be transmitted in one or more OFDM/LFDM symbols, then data may be transmitted in one or more OFDM/LFDM symbols, etc. Pilot may also be transmitted using short symbols generated with a smaller FFT size (e.g., K/2). For example, a transmission may include two short symbols for pilot and six regular symbols for data. For LFDM, pilot and data are typically not sent in the same LFDM symbol. For OFDM, pilot and data may be sent in the same OFDM symbol on different subcarriers. The multiplexing of data and pilot in the same OFDM symbol may reduce pilot overhead. With OFDM, it is possible to efficiently allocate frequency resources between data and pilot depending on the number of resource blocks allocated to a UE as it can utilize disjoint RBs that are assigned to it even from different channel trees.

Figure 13:
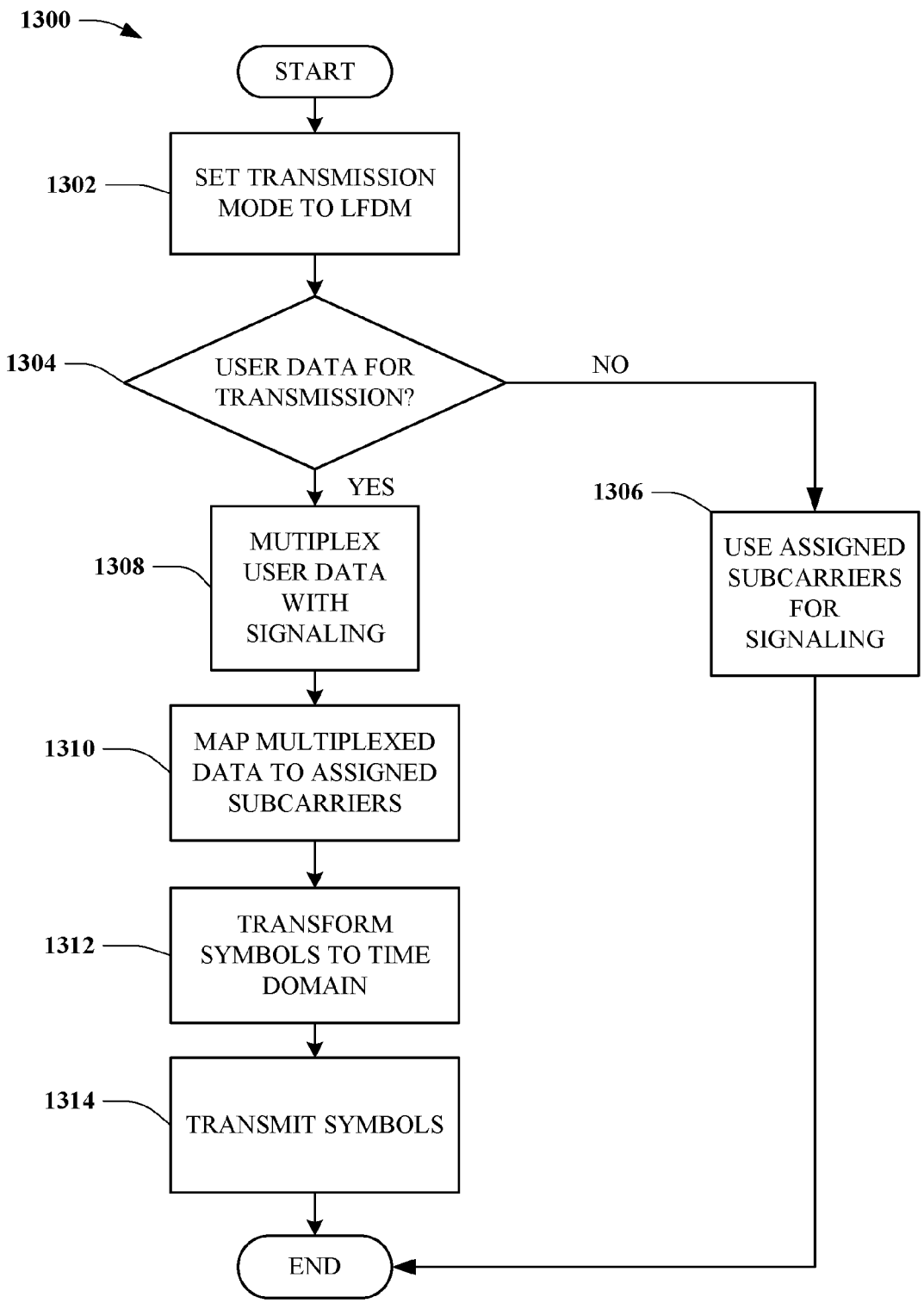
FIG. 13 is a methodology of transmission utilized by a communication system when transmitting in LFDM mode in accordance with various aspects detailed herein.

FIG. 13 is a methodology of transmission 1300 utilized by a communication system when transmitting in LFDM mode in accordance with various aspects detailed supra. At 1302, it is initially determined by the UE that it should transmit in LFDM mode based on signaling from an associated Node B. At 1304, it is determined if there is user data to be transmitted. If there is no user data from transmission, the UE can utilize the assigned RBs to send signaling as show at 1306. However, the UE may also be statically assigned a small number of subcarriers near one band edge for a control channel. Thus, the UE can send signaling on the designated subcarriers for the control channel when there is no data to send. The designated subcarriers may not be contiguous with the dynamically allocated resource blocks. When that is the case, the UE may not be able to use the designated subcarriers along with the allocated resource blocks. If there is user data to be transmitted, at 1308 the user data is multiplexed with the signaling for transmission. The multiplexed data is mapped to the designated subcarriers at 1310 to generate the LFDM waveform. The mapped symbols are then transformed to the time domain, for example, by utilizing a DFT unit at 1312. At 1314, the symbols are transmitted on resources assigned in accordance with the modes as described, for example, semi-statically or dynamically. However, as stated supra, while LFDM has the advantage of low PAPR, it requires that contiguous RBs be assigned in order to transmit user data thereby leading to restrictions in scheduler operations.

For a UE employing OFDM, the transmission method is similar to the method discussed supra with respect to LFDM with the exception that the Fourier transformation of symbols at step 1312 is by-passed. Although OFDM has high PAPR, it allows disjoint subcarriers to be used to send data and/or signaling. Signaling may be sent on any allocated subcarriers. The UE may send signaling on the designated subcarriers when there is no data to send and may use these subcarriers for data and/or signaling when there is data to send. Hence, the designated subcarriers may be fully utilized with OFDM, and no bandwidth loss is observed.

Joint operation of OFDM and LFDM allows for dynamic transition between these two multiplexing schemes to obtain the advantages of both the schemes such as:
  Allow for better utilization of the system bandwidth,
  Achieve higher multi-user scheduling gain,
  Achieve higher subband scheduling gain,
  Provide link level gain for high SNR users,
  Provide more flexibility in SIMO/MIMO operations,
  Provide more freedom in pilot sequence selection and easier network planning,
  Provide more flexibility in adjusting pilot overhead percentage,
  Reduce bandwidth loss associated with LFDM control channel,
  Provide link level gain versus LFDM, and
  Provide lower implementation complexity compared to LFDM.

The techniques described herein may be implemented by various means. For example, these techniques may be implemented in hardware, firmware, software, or a combination thereof. For a hardware implementation, the processing units at a UE or a Node B may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An apparatus comprising:
  a processor configured to send an indication to a user equipment (UE) to operate in accordance with a multi-carrier multiplexing scheme for communicating with the apparatus or a single-carrier multiplexing scheme for communicating with the apparatus, determine if contiguous resource blocks are available to assign to the UE for the single-carrier multiplexing scheme, assign the contiguous resource blocks to the UE if the contiguous resource blocks are available and if an indication to operate in accordance with the single-carrier multiplexing scheme is sent, assign non-contiguous resource blocks to the UE if the contiguous resource blocks are not available and if an indication to operate in accordance with the multi-carrier multiplexing scheme is sent, and perform processing for a transmission received at the apparatus from the UE in accordance with the indicated multiplexing scheme; and a memory coupled to the processor.

2. The apparatus of claim 1, wherein the multi-carrier multiplexing scheme is Orthogonal Frequency Division Multiplexing (OFDM).

3. The apparatus of claim 1, wherein the single-carrier multiplexing scheme is one of Localized Frequency Division Multiplexing (LFDM) or Interleaved Frequency Division Multiplexing (IFDM).

4. The apparatus of claim 1, wherein the processor selects the single-carrier multiplexing scheme for a low signal-to-noise ratio (SNR), and selects the multi-carrier multiplexing scheme for a high SNR.

5. The apparatus of claim 1, wherein a UE is configured for single-input multiple-output (SIMO) operation when the processor selects the single-carrier multiplexing scheme, and for multiple-input multiple-output (MIMO) operation when the processor selects the multi-carrier multiplexing scheme.

6. The apparatus of claim 1, wherein the processor semi-statically selects the single-carrier multiplexing scheme or the multi-carrier multiplexing scheme for the UE.

7. The apparatus of claim 1, comprising a scheduler that dynamically selects the single-carrier multiplexing scheme or the multi-carrier multiplexing scheme for the UE, and sends the indication via signaling to the UE.

8. The apparatus of claim 7, wherein the signaling comprises a mode bit having a first value to indicate the multi-carrier multiplexing scheme or a second value to indicate the single-carrier multiplexing scheme.

9. The apparatus of claim 1, wherein the processor assigns continuous subcarriers to the UE for the single-carrier multiplexing scheme, and assigns continuous or non-continuous subcarriers to the UE for the multi-carrier multiplexing scheme.

10. The apparatus of claim 1, wherein the processor assigns subcarriers to the UE based on a first channel tree for the single-carrier multiplexing scheme and based on a second channel tree for the multi-carrier multiplexing scheme.

11. The apparatus of claim 1, wherein the processor receives the transmission from the UE via multiple antennas, and performs multiple-input multiple-output (MIMO) detection to spatially separate multiple streams sent in the transmission.

12. The apparatus of claim 11, wherein the processor processes at least one stream in the multiple streams based on the single-carrier multiplexing scheme and processes at least one other stream in the multiple streams based on the multi-carrier multiplexing scheme.

13. The apparatus of claim 12, wherein the processor performs processing for the at least one stream based on the single-carrier multiplexing scheme prior to processing for the at least one other stream based on the multi-carrier multiplexing scheme.

14. A method of a base station, comprising:
sending an indication to a user equipment (UE) to operate in accordance with a multi-carrier multiplexing scheme for communicating with the base station or a single-carrier multiplexing scheme for communicating with the base station;
determining if contiguous resource blocks are available to assign to the UE for the single-carrier multiplexing scheme;
assigning the contiguous resource blocks to the UE if the contiguous resource blocks are available and if an indication to operate in accordance with the single-carrier multiplexing scheme is sent;
assigning non-contiguous resource blocks to the UE if the contiguous resource blocks are not available and if an indication to operate in accordance with the multi-carrier multiplexing scheme is sent; and
performing processing for a transmission received at the base station from the UE in accordance with the indicated multiplexing scheme.

15. The method of claim 14, further comprising:
selecting the single-carrier multiplexing scheme for a low signal-to-noise ratio (SNR); and
selecting the multi-carrier multiplexing scheme for a high SNR.

16. An apparatus comprising:
means for sending an indication to a user equipment (UE) to operate in accordance with a multi-carrier multiplexing scheme for communicating with the apparatus or a single-carrier multiplexing scheme for communicating with the apparatus;
means for determining if contiguous resource blocks are available to assign to the UE for the single-carrier multiplexing scheme;
means for assigning the contiguous resource blocks to the UE if the contiguous resource blocks are available and if an indication to operate in accordance with the single-carrier multiplexing scheme is sent;
means for assigning non-contiguous resource blocks to the UE if the contiguous resource blocks are not available and if an indication to operate in accordance with the multi-carrier multiplexing scheme is sent; and
means for performing processing for a transmission received at the apparatus from the UE in accordance with the indicated multiplexing scheme.

17. The apparatus of claim 16, further comprising:
means for selecting the single-carrier multiplexing scheme for a low signal-to-noise ratio (SNR); and
means for selecting the multi-carrier multiplexing scheme for a high SNR.

18. A non-transitory processor readable media for storing instructions operable to:
send an indication to a user equipment (UE) to operate in accordance with a multi-carrier multiplexing scheme for communicating with a base station or a single-carrier multiplexing scheme for communicating with the base station;
determine if contiguous resource blocks are available to assign to the UE for the single-carrier multiplexing scheme;
assign the contiguous resource blocks to the UE if the contiguous resource blocks are available and if an indication to operate in accordance with the single-carrier multiplexing scheme is sent;
assign non-contiguous resource blocks to the UE if the contiguous resource blocks are not available and if an indication to operate in accordance with the multi-carrier multiplexing scheme is sent; and
perform processing for a transmission received at the base station from the UE in accordance with the indicated multiplexing scheme.

19. The non-transitory processor readable media of claim 18, and further for storing instructions operable to:
select the single-carrier multiplexing scheme for a low signal-to-noise ratio (SNR); and select the multi-carrier multiplexing scheme for a high SNR.

20. An apparatus comprising:
a processor configured to determine if contiguous resource blocks are available to assign to a first user equipment (UE) for communicating with the apparatus according to a single-carrier multiplexing scheme, to assign the contiguous resource blocks to the first UE if the contiguous resource blocks are available and if an indication to operate in accordance with the single-carrier multiplexing scheme is sent, to process a first transmission received at the apparatus from the first UE in accordance with the single-carrier multiplexing scheme, to assign non-contiguous resource blocks to the first UE for communicating with the apparatus according to a multi-carrier multiplexing scheme if the contiguous resource blocks are not available and if an indication to operate in accordance with the multi-carrier multiplexing scheme is sent, and to process a second transmission received at the apparatus from a second UE in accordance with the multi-carrier multiplexing scheme; and
a memory coupled to the processor.

21. The apparatus of claim 20, wherein the processor receives the first transmission in a first time interval and receives the second transmission in a second time interval.

22. The apparatus of claim 20, wherein the processor receives the first transmission on a first set of subcarriers and receives the second transmission on a second set of subcarriers.

23. The apparatus of claim 22, wherein the processor performs discrete Fourier transform (DFT) on received samples to obtain frequency-domain symbols for the first and second sets of subcarriers, performs inverse FFT (IFFT) on frequency-domain symbols from the first set of subcarriers to obtain received symbols for the first transmission, and provides frequency-domain symbols from the second set of subcarriers as received symbols for the second transmission.

24. The apparatus of claim 20, wherein the processor receives the first and second transmissions via multiple antennas, and performs multiple-input multiple-output (MIMO) detection to spatially separate the first and second transmissions.

25. A method of a base station comprising:
determining if contiguous resource blocks are available to assign to a first user equipment (UE) for communicating with the base station according to a single-carrier multiplexing scheme;
assigning the contiguous resource blocks to the first UE if an indication to operate in accordance with the single-carrier multiplexing scheme is sent;
processing a first transmission received at the base station from the first UE in accordance with the single-carrier multiplexing scheme;
assigning non-contiguous resource blocks to the first UE for communicating with the base station according to a multi-carrier multiplexing scheme if the contiguous resource blocks are not available and if an indication to operate in accordance with the multi-carrier multiplexing scheme is sent; and
processing a second transmission received at the base station from a second UE in accordance with the multi-carrier multiplexing scheme.

26. The method of claim 25, further comprising:
receiving the first transmission on a first set of subcarriers; and
receiving the second transmission on a second set of subcarriers.

27. An apparatus comprising:
means for determining if contiguous resource blocks are available to assign to a first user equipment (UE) for communicating with the apparatus according to a single-carrier multiplexing scheme;
means for assigning the contiguous resource blocks to the first UE if an indication to operate in accordance with the single-carrier multiplexing scheme is sent;
means for processing a first transmission received at the apparatus from the first UE in accordance with the single-carrier multiplexing scheme;
means for assigning non-contiguous resource blocks to the first UE for communicating with the apparatus according to a multi-carrier multiplexing scheme if the contiguous resource blocks are not available and if an indication to operate in accordance with the multi-carrier multiplexing scheme is sent; and
means for processing a second transmission received at the apparatus from a second UE in accordance with the multi-carrier multiplexing scheme.

28. The apparatus of claim 27, further comprising:
means for receiving the first transmission on a first set of subcarriers; and
means for receiving the second transmission on a second set of subcarriers.

29. A non-transitory processor readable media for storing instructions operable to:
determine if contiguous resource blocks are available to assign to a first user equipment (UE) for communicating with a base station according to a single-carrier multiplexing scheme;
assign the contiguous resource blocks to the first UE if an indication to operate in accordance with the single-carrier multiplexing scheme is sent;
process a first transmission received at the base station from the first UE in accordance with the single-carrier multiplexing scheme;
assign non-contiguous resource blocks to the first UE for communicating with the base station according to a multi-carrier multiplexing scheme if the contiguous resource blocks are not available and if an indication to operate in accordance with the multi-carrier multiplexing scheme is sent; and
process a second transmission received at the base station from a second UE in accordance with a multi-carrier multiplexing scheme.

30. The non-transitory processor readable media of claim 29, and further for storing instructions operable to:
receive the first transmission on a first set of subcarriers; and
receive the second transmission on a second set of subcarriers.

31. An apparatus comprising:
a processor configured to receive an indication from a base station to operate in accordance with a multi-carrier multiplexing scheme for communicating with the base station or a single-carrier multiplexing scheme for communicating with the base station, to receive an assignment of contiguous resource blocks if an indication to operate in accordance with the single-carrier multiplexing scheme is received, and to perform processing for transmission to the base station in accordance with the indicated multiplexing scheme; and
a memory coupled to the processor,
wherein the processor maps data on continuous subcarriers for the single-carrier multiplexing scheme, and maps data on continuous or non-continuous subcarriers for the multi-carrier multiplexing scheme.

32. The apparatus of claim 31, wherein the multi-carrier multiplexing scheme is Orthogonal Frequency Division Multiplexing (OFDM).

33. The apparatus of claim 31, wherein the single-carrier multiplexing scheme is one of Localized Frequency Division Multiplexing (LFDM) or Interleaved Frequency Division Multiplexing (IFDM).

34. The apparatus of claim 31, wherein the processor sends a first pilot sequence if the single-carrier multiplexing scheme is selected and sends a second pilot sequence if the multi-carrier multiplexing scheme is selected.

35. The apparatus of claim 34, wherein the processor generates the first pilot sequence based on a polyphase sequence.

36. The apparatus of claim 34, wherein the processor generates the second pilot sequence based on modulation symbols from a modulation scheme.

37. The apparatus of claim 31, wherein the processor sends pilot without data in a single-carrier symbol if the single-carrier multiplexing scheme is selected and multiplexes data with pilot in a multi-carrier symbol if the multi-carrier multiplexing scheme is selected.

38. The apparatus of claim 31, wherein the processor utilizes a first symbol duration for data and utilizes a second symbol duration shorter than the first symbol duration for pilot.

39. The apparatus of claim 31, wherein the base station is a Node B and the processor receives the indication via signaling from the Node B.

40. The apparatus of claim 31, comprising multiple antennas, and the processor performs multiple-input multiple-output (MIMO) detection to spatially separate multiple streams received in a transmission.

41. The apparatus of claim 40, wherein the processor processes at least one stream in the multiple streams based on the single-carrier multiplexing scheme and processes at least one other stream in the multiple streams based on the multi-carrier multiplexing scheme.

42. The apparatus of claim 41, wherein the processor performs processing for the at least one stream based on the single-carrier multiplexing scheme prior to processing for the at least one other stream based on the multi-carrier multiplexing scheme.

43. The apparatus of claim 40, wherein the processor transmits a plurality of data streams via one or more of the multiple antennas.

44. The apparatus of claim 43, wherein each of the plurality of data streams are modulated in accordance with the single-carrier multiplexing scheme or the multi-carrier multiplexing scheme based on one or more attributes of the respective data streams.

45. The apparatus of claim 44, wherein one or more of the data streams with low SNR are modulated according to the single-carrier multiplexing scheme while one or more of the data streams with high SNR are modulated according to the multi-carrier multiplexing scheme.

46. The apparatus of claim 44, the plurality of data streams modulated in accordance with the single-carrier multiplexing scheme are transmitted from one of the multiple antennas while the plurality of data streams modulated in accordance with the multi-carrier multiplexing scheme are transmitted from at least two of the multiple antennas.

47. The apparatus of claim 44, the plurality of data streams modulated in accordance with the single-carrier multiplexing scheme and the multi-carrier multiplexing scheme are transmitted from one of the multiple antennas.

48. The apparatus of claim 44, the plurality of data streams modulated in accordance with the single-carrier multiplexing scheme and the multi-carrier multiplexing scheme are transmitted from at least a plurality of the multiple antennas.

49. The apparatus of claim 44, the plurality of data streams modulated in accordance with the single-carrier multiplexing scheme are transmitted from at least two of the multiple antennas while the plurality of data streams modulated in accordance with the multi-carrier multiplexing scheme are transmitted from one of the multiple antennas.

50. A method comprising:
receiving an indication from a base station to operate in accordance with a multi-carrier multiplexing scheme for communicating with the base station or a single-carrier multiplexing scheme for communicating with the base station;
receiving an assignment of contiguous resource blocks if an indication to operate in accordance with the single-carrier multiplexing scheme is received; and
performing processing for transmission to the base station in accordance with the indicated multiplexing scheme,
wherein the performing processing comprises:
mapping data on continuous subcarriers for the single-carrier multiplexing scheme, and
mapping data on continuous or non-continuous subcarriers for the multi-carrier multiplexing scheme.

51. An apparatus comprising:
means for receiving an indication from a base station to operate in accordance with a multi-carrier multiplexing scheme for communicating with the base station or a single-carrier multiplexing scheme for communicating with the base station;
means for receiving an assignment of contiguous resource blocks if an indication to operate in accordance with the single-carrier multiplexing scheme is received; and
means for performing processing for transmission to the base station in accordance with the indicated multiplexing scheme,
wherein the means for performing processing is configured to:
map data on continuous subcarriers for the single-carrier multiplexing scheme, and
map data on continuous or non-continuous subcarriers for the multi-carrier multiplexing scheme.

52. A non-transitory processor readable media for storing instructions operable to:
receive an indication from a base station to operate in accordance with a multi-carrier multiplexing scheme for communicating with the base station or a single-carrier multiplexing scheme for communicating with the base station;
receive an assignment of contiguous resource blocks if an indication to operate in accordance with the single-carrier multiplexing scheme is received;
perform processing for transmission to the base station in accordance with the indicated multiplexing scheme;
map data on continuous subcarriers for the single-carrier multiplexing scheme; and
map data on continuous or non-continuous subcarriers for the multi-carrier multiplexing scheme.

* * * * *